(12) United States Patent
Chiba et al.

(10) Patent No.: US 7,876,980 B2
(45) Date of Patent: Jan. 25, 2011

(54) IMAGING APPARATUS AND IMAGING METHOD FOR OUTPUTTING A SPECIFIED NUMBER OF PIXELS IN A SPECIFIED AREA

(75) Inventors: Takuma Chiba, Osaka (JP); Kazuo Okamoto, Osaka (JP); Yuji Nagaishi, Osaka (JP); Tatsuro Juri, Osaka (JP)

(73) Assignee: Panasonic Corporation, Osaka (JP)

( * ) Notice: Subject to any disclaimer, the term of this patent is extended or adjusted under 35 U.S.C. 154(b) by 1037 days.

(21) Appl. No.: 11/271,128

(22) Filed: Nov. 10, 2005

(65) Prior Publication Data

US 2006/0119903 A1 Jun. 8, 2006

(30) Foreign Application Priority Data

Nov. 11, 2004 (JP) ............................. 2004-327605

(51) Int. Cl.
*G06K 9/22* (2006.01)
*H04N 1/04* (2006.01)
*G06K 9/00* (2006.01)

(52) U.S. Cl. ........................................ 382/315; 358/474
(58) Field of Classification Search ................ 382/154, 382/164, 172, 190, 218, 219, 284, 299, 300, 382/312, 315, 317; 358/443, 445, 448, 465, 358/471, 474, 497; 348/272, 277, 322, 363, 348/E3.019; 250/208.1, 559.1, 559.29; 355/55; 356/141.4; 235/462.04

See application file for complete search history.

(56) References Cited

U.S. PATENT DOCUMENTS

| | | | | |
|---|---|---|---|---|
| 4,302,779 A | * | 11/1981 | Inoue | 348/322 |
| 4,326,217 A | * | 4/1982 | Iwasawa et al. | 358/527 |
| 4,489,423 A | * | 12/1984 | Suzuki | 377/58 |
| 4,651,226 A | * | 3/1987 | Motoori et al. | 358/497 |
| 4,792,830 A | * | 12/1988 | Matsumoto | 355/55 |
| 5,196,900 A | * | 3/1993 | Pettersen | 356/141.4 |
| 5,216,258 A | * | 6/1993 | McConnell | 250/559.1 |
| 5,260,559 A | * | 11/1993 | Miyasaka | 250/208.1 |
| 5,672,858 A | * | 9/1997 | Li et al. | 235/462.04 |
| 5,982,957 A | * | 11/1999 | DeCaro et al. | 382/312 |
| 6,014,167 A | | 1/2000 | Suito et al. | |
| 6,229,972 B1 | * | 5/2001 | Rushing | 399/74 |
| 6,473,538 B2 | * | 10/2002 | Kozuka | 382/312 |
| 6,522,777 B1 | * | 2/2003 | Paulsen et al. | 382/154 |

(Continued)

FOREIGN PATENT DOCUMENTS

JP 2-141880 A 5/1990

(Continued)

*Primary Examiner*—Amir Alavi
(74) *Attorney, Agent, or Firm*—RatnerPrestia

(57) ABSTRACT

The resolution, frame rate, or both can be improved when imaging moving subjects in an imaging apparatus using a CMOS image sensor. The imaging apparatus has an image sensor having a two-dimensional array of pixels. Each of the pixels includes an element operable to produce an electric charge by photoelectrically converting light from an imaged subject and a part operable to accumulate the produced charge and output an accumulated charge or a signal representing the accumulated charge. The imaging apparatus also has an area control unit operable to define a specified area of the image sensor containing a plurality of pixels and an area density control unit operable to specify a density of pixels read from the specified area defined by the area control unit.

18 Claims, 23 Drawing Sheets

U.S. PATENT DOCUMENTS

| | | | |
|---|---|---|---|
| 6,906,751 B1 | 6/2005 | Norita et al. | |
| 7,154,547 B2 * | 12/2006 | Oda | 348/277 |
| 7,646,891 B2 | 1/2010 | Kage et al. | |
| 2003/0169355 A1 * | 9/2003 | Kubo | 348/272 |
| 2004/0105129 A1 | 6/2004 | Kawakami | |
| 2004/0145668 A1 | 7/2004 | Iwasawa et al. | |
| 2004/0169767 A1 | 9/2004 | Norita et al. | |
| 2006/0119903 A1 * | 6/2006 | Chiba et al. | 358/474 |
| 2006/0152590 A1 | 7/2006 | Kage et al. | |

FOREIGN PATENT DOCUMENTS

| | | |
|---|---|---|
| JP | 4-267210 A | 9/1992 |
| JP | 5-292478 A | 11/1993 |
| JP | 7-015649 A | 1/1995 |
| JP | 9-205575 A | 8/1997 |
| JP | 11-213136(A1) | 8/1999 |
| JP | 2000-032318 A | 1/2000 |
| JP | 2000-041186 A | 2/2000 |
| JP | 2001-109422 A | 4/2001 |
| JP | 2003-189186 A | 7/2003 |
| JP | 2004-180099(A) | 6/2004 |
| JP | 2004-229119 A | 8/2004 |
| JP | 2005-132344 | 3/2010 |
| JP | 2005-132344 | 7/2010 |
| WO | WO2004/062270 A1 | 7/2004 |

* cited by examiner

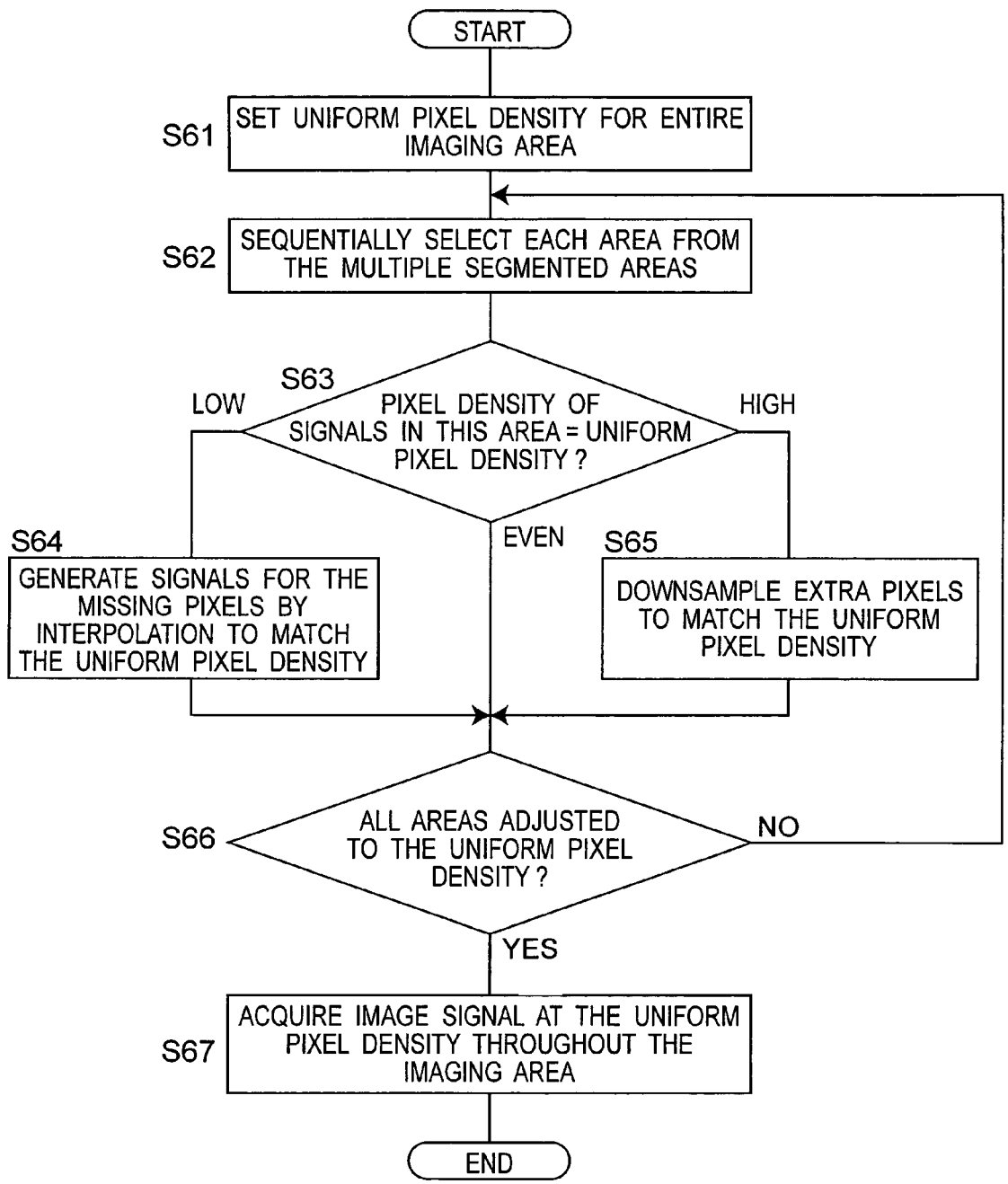

IMAGING APPARATUS AND IMAGING METHOD FOR OUTPUTTING A SPECIFIED NUMBER OF PIXELS IN A SPECIFIED AREA

BACKGROUND OF THE INVENTION

1. Field of Technology

The present invention relates to an imaging apparatus using a MOS solid state imaging element, and to an imaging method.

2. Description of Related Art

Solid state imaging elements (image sensors) are used to convert light from a subject to an electric signal in digital cameras, video cameras, and other imaging devices used in applications for capturing and storing images. Solid state imaging elements mainly include CCD image sensors and MOS image sensors. CCD image sensors are more common today, however, because of such features as a wide dynamic range and isochronous imaging performance. Disadvantages to CCD image sensors include high power consumption and the need for different power supply voltages, and further significant improvement in these characteristics is not expected.

MOS image sensors have a narrower dynamic range and are more susceptible to noise than CCD image sensors, but recent research has reduced the performance gap between MOS and CCD image sensors. In addition, CMOS image sensors offer a number of advantages over CCD image sensors, including lower power consumption and random accessibility, that is, the ability to freely define the order in which the pixels are read. Furthermore, because CMOS image sensors can be manufactured using the same equipment and materials used to manufacture CMOS semiconductor devices, existing CMOS semiconductor fabrication plants can be used to manufacture CMOS image sensors, thereby reducing cost. Because of these numerous benefits, CMOS image sensors are increasingly common.

Solid state image sensors are used in such products as digital still cameras, video cameras, and cell phones, and produce still or video images through the following process.

(a) The electric signals acquired by the CCD or MOS image sensor are read pixel by pixel one line at a time from one end of the sensor, and temporarily stored in relatively inexpensive memory, such as SDRAM (synchronous DRAM).

(b) When reading and writing the first line to SDRAM ends, the process repeats to read the second line, then the third line, and so forth until one full frame has been stored in SDRAM.

(c) These signals are then read from SDRAM and passed to a signal processor for zoom processing to enlarge or reduce the image, and the data is again written to SDRAM.

(d) The processed data is then read from SDRAM and compressed to a format suitable for recording, such as JPEG image data, and the compressed image data is again written to SDRAM.

(e) The compressed data is then read quickly from SDRAM by DMA (direct memory access) control, for example, and output to external semipermanent storage.

When capturing motion picture images, however, the number of frames captured per second is an extremely important factor determining the quality and smoothness of the captured video. Based on recent data, capturing from 30 to as many as 60 frames per second (fps) is necessary. At 30 fps, 1/30 second can be used to capture each frame. At a VGA image size of 640×480 pixels, data for 307,200 pixels must be extracted. For a high definition image, image data for 1920×1080=2,073,600 pixels, that is, 6.75 times as many pixels in a VGA image, must be captured. Driving the image sensor at such high seed depends greatly upon the CMOS process, and is technically difficult.

SUMMARY OF THE INVENTION

Using HDTV images measuring 1920×1080 pixels by way of example, capturing video using high resolution images at a 30 fps rate requires extracting pixel data for more than two million pixels per frame every 1/30 second from the image sensor. Reading this many pixels in such a short time is very difficult at the operating rate of current image sensors, however, and even if the pixels can be read, the dynamic range of the read pixels is insufficient.

An object of the present invention is therefore to improve the resolution, the frame rate, or both the resolution and frame rate of video images captured by an imaging apparatus using a CMOS image sensor.

A further object of the invention is to enable capturing even high resolution video at a high frame rate using the same CMOS image sensor.

To achieve this object, an imaging apparatus according to the present invention has an image sensor having a two-dimensional array of pixels. Each of the pixels includes an element operable to produce an electric charge by photoelectrically converting light from an imaged subject and a part operable to accumulate the produced charge and output an accumulated charge or a signal representing the accumulated charge. The imaging apparatus also has an area control unit operable to define a specified area of the image sensor containing a plurality of pixels and an area density control unit operable to specify a density of pixels read from the specified area defined by the area control unit.

An imaging method according to the present invention is an imaging method for capturing images from an image sensor having a two-dimensional array of pixels, the imaging method having: defining a specified area of the image sensor containing a plurality of pixels; specifying a density of pixels read from the specified area; reading signals from the specified area at the specified pixel density; and converting signals from each area to a specified pixel density so that the pixel density of all signals in the image is the same specified pixel density.

A MOS image sensor is randomly accessible, enabling the pixel reading sequence to be freely controlled. This invention uses this characteristic of MOS image sensors. More specifically, the invention has means for setting the area of the image sensor to be read, and a means for setting the density at which pixels are read from the specified area. The density at which pixels are read is set high in the areas requiring high resolution, and sets a low pixel density in areas that will have minimal effect on overall image quality even at a lower resolution. This shortens the image sensor read time and thus makes it possible to increase the frame rate.

Signals read from low resolution areas are upsampled to boost the resolution to the same resolution used in the high resolution areas, thereby producing an image with high resolution overall.

The area defined by the area control unit is preferably an area with much movement, an area containing pixels with a high frequency component, or an area in the neighborhood of the position (rangefinding point) where the image is focused.

Areas containing pixels where the image signal changes greatly between temporally consecutive frames are areas containing much movement, or more particularly containing a moving subject. Increasing the resolution in these areas can improve image definition in areas containing movement.

Furthermore, areas containing pixels with a high frequency component in one frame are the areas containing the edges of the image subject. Increasing the resolution in these areas produces sharper subject contours.

Furthermore, areas used for focusing are typically the areas containing the main subject being imaged, and are therefore the areas of greatest interest to the photographer. Increasing resolution in these areas produces an image that appears to have higher resolution overall.

Furthermore, when there is not enough time to read all pixels in one frame at a high frame rate, defining the area imaged at a high resolution and lowering the resolution in the other image areas enables maintaining a high frame rate while imaging moving subjects at a high resolution. As a result, motion pictures can be captured at an apparently high resolution overall.

Other objects and attainments together with a fuller understanding of the invention will become apparent and appreciated by referring to the following description and claims taken in conjunction with the accompanying drawings.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 23 is a flow chart of step S54 in FIG. 22 in detail.

DESCRIPTION OF THE PREFERRED EMBODIMENTS

Figure 1:
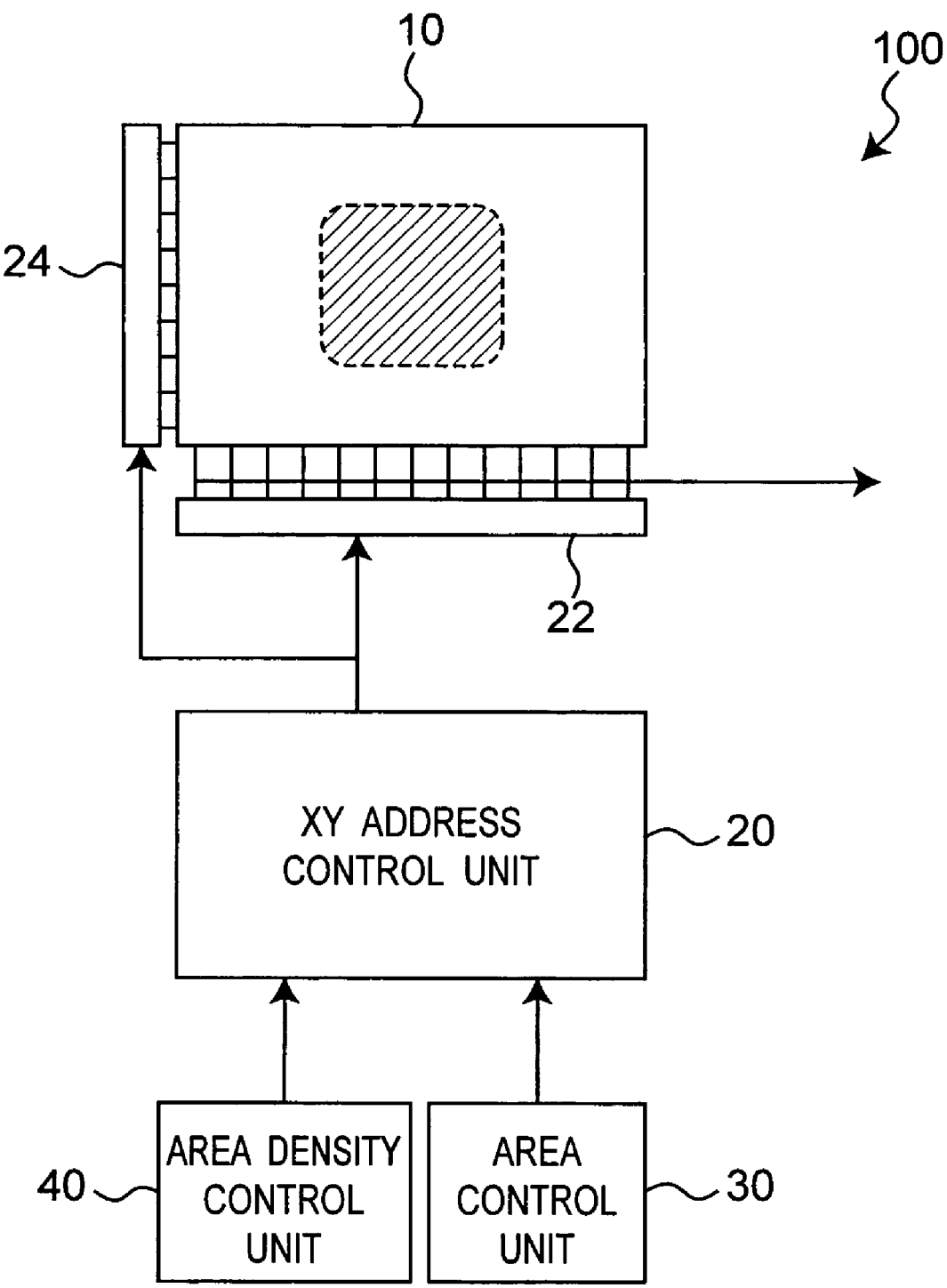
FIG. 1 is a block diagram of an imaging apparatus according to a first embodiment of the invention.

Preferred embodiments of an imaging apparatus and an image method according to the present invention are described below with reference to the accompanying figures. Note that functionally identical parts are identified by the same reference numerals in the accompanying figures.

Embodiment 1

An imaging apparatus 100 according to a first embodiment of the present invention is described below with reference to FIG. 1 to FIG. 7. FIG. 1 is a block diagram of an imaging apparatus 100 according to this first embodiment of the invention.

As shown in FIG. 1, this imaging apparatus 100 has an image sensor 10, XY address control unit 20, horizontal selection circuit 22, vertical selection circuit 24, area control unit 30, and area density control unit 40.

Figure 2:
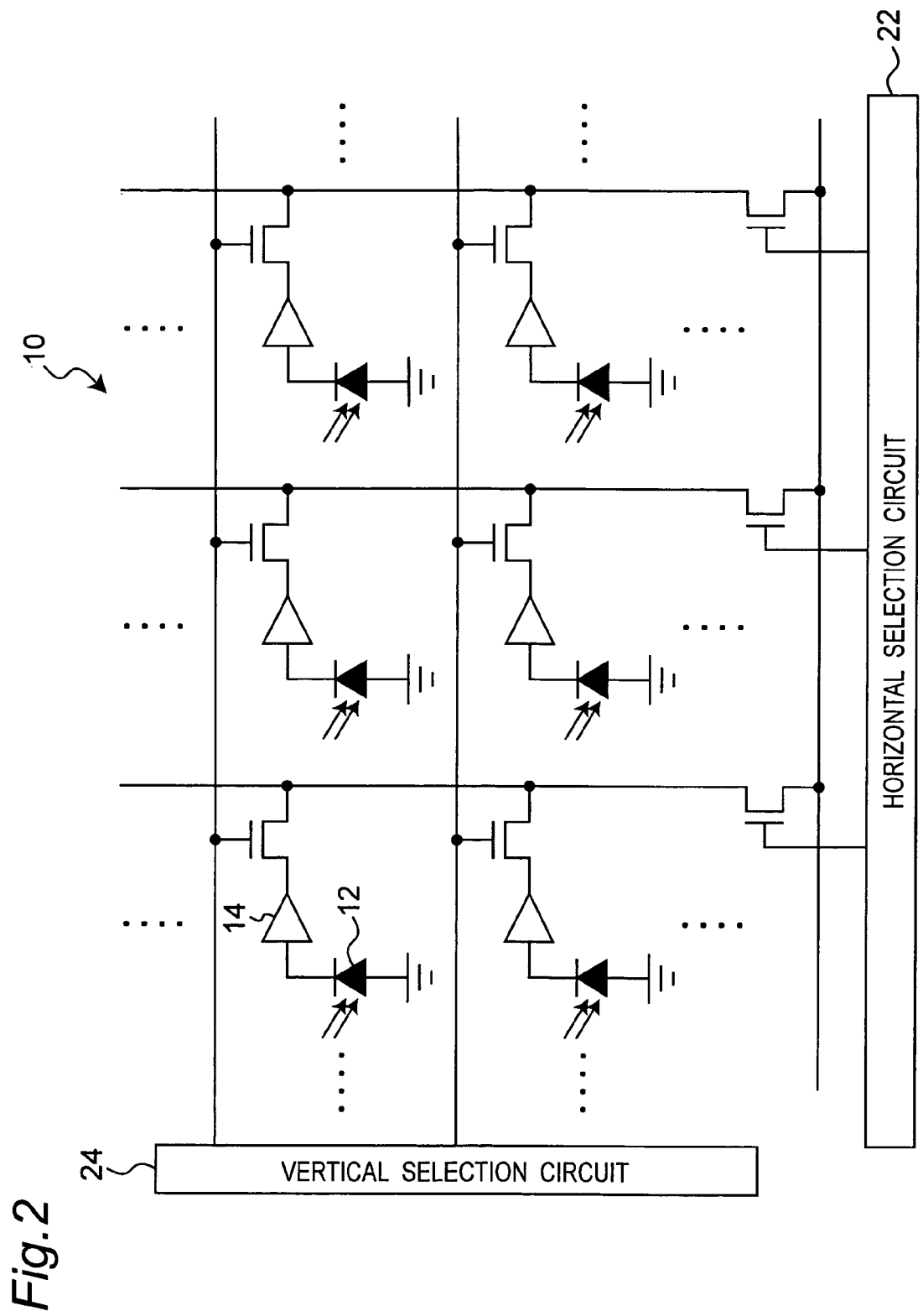
FIG. 2 is a schematic circuit diagram of the image sensor.

FIG. 2 is a schematic circuit diagram of the image sensor 10. This image sensor 10 is a CMOS image sensor. This CMOS sensor 10 is a two-dimensional array of pixels, each pixel having an element 12 operable to produce an electric charge by photoelectrically converting light from an imaged subject, and a part 14 operable to accumulate the produced charge and output a signal representing the accumulated charge. The elements 12 that photoelectrically convert light to produce a charge are called photodiodes. Each pixel in the two-dimensional array can be uniquely identified by an X-Y address having the values X and Y. More specifically, the pixel at the selected X-Y address identified by the XY address control unit 20 is selected by the horizontal selection circuit 22 and vertical selection circuit 24, and a signal denoting the charge accumulated in the addressed pixel is output. This output signal is input to an A/D converter (not shown in the figure). The A/D converter converts the input signal to a digital value denoting the accumulated charge, and the resulting digital value is output as the output from the CMOS sensor 10.

Figure 3:
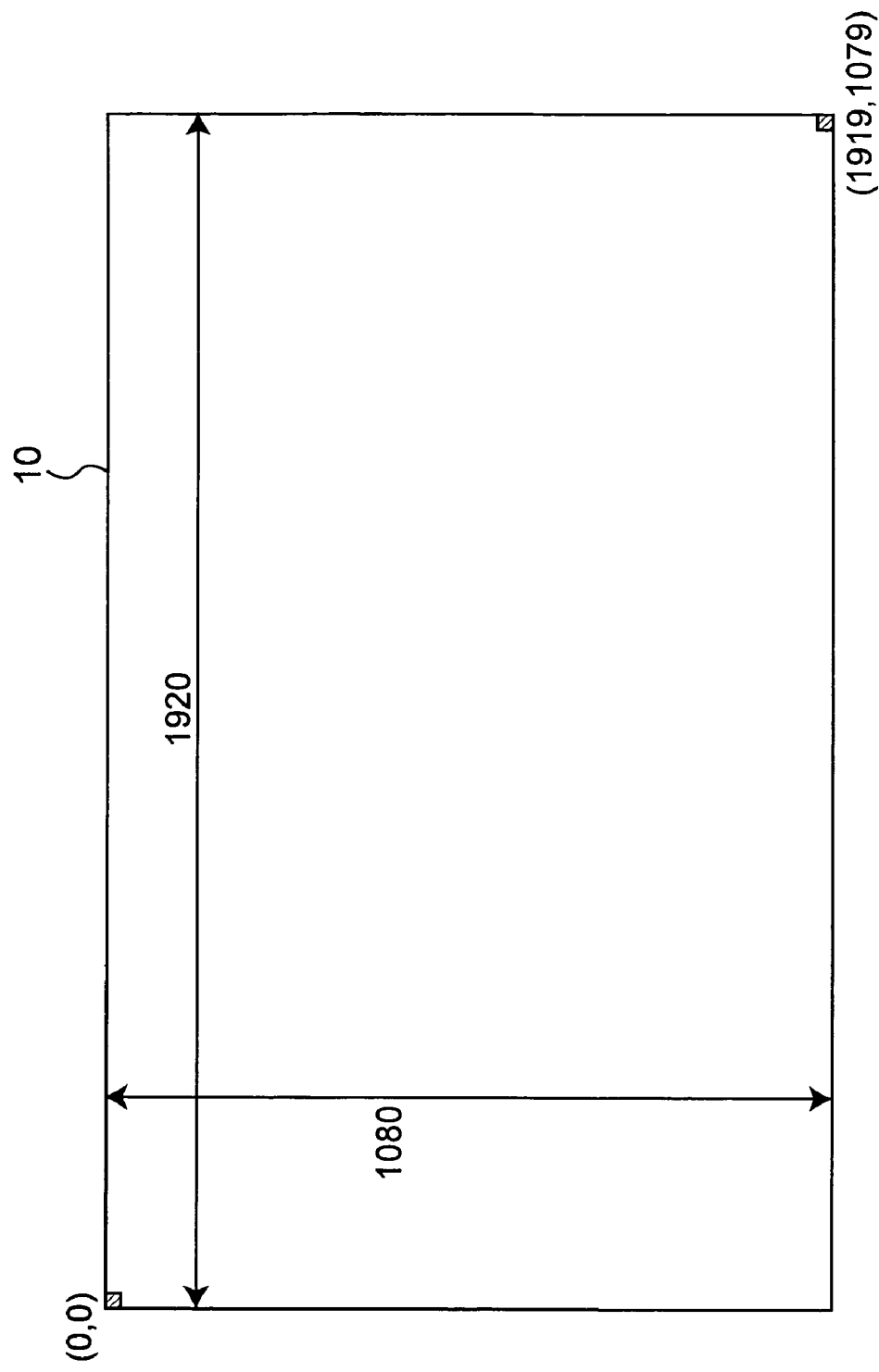
FIG. 3 shows the arrangement of the two-dimensional pixel array of the CMOS sensor.

FIG. 3 shows the arrangement of the two-dimensional pixel array of the CMOS sensor 10. The CMOS sensor 10 in this example has 1920 horizontal pixels and 1080 vertical pixels for a total 2,073,600 pixels. The X-Y address of the top left corner pixel is (X,Y)=(0,0), and the X-Y address of the bottom right corner pixel is (X,Y)=(1919, 1079). It will be obvious that the number of pixels shall not be limited to the arrangement shown in FIG. 3.

The area control unit 30 and area density control unit 40 of this imaging apparatus 100 are described next.

The area control unit 30 specifies an area containing a specific number of pixels in the image sensor 10. How the area control unit 30 specifies this pixel area is further described below.

The area density control unit 40 specifies the density of the pixels in the area to be read specified by the area control unit 30. For example, if the area density control unit 40 specifies a pixel density of 1, all pixels in the specified area are read. If the area density control unit 40 specifies a pixel density of ¼, one of every four pixels is read. Thus, if the area specified by the area control unit 30 is from pixel (0,0) to pixel (1919, 1079), and the pixel density is set to ¼, then 518,400 pixels are read; if the pixel density is set to ¹⁄₁₆, then one of every 16 pixels is read and a total 129,600 pixels is read from the entire image sensor 10 area.

Pixel signals must be read from the image sensor 10 at the pixel density specified for the area being read. The area control unit 30 and area density control unit 40 therefore input to the XY address control unit 20 information identifying the area specified for reading (the "read area" below) and the specified pixel density. Pixel signals are then read from the read area defined by the area control unit 30 at the pixel density specified by the area density control unit 40. The pixels in the area outside this read area are read the normal pixel density, which is usually all pixels.

How pixel signals are read from the read area and the area outside the read area in the image sensor 10 is described next with reference to FIG. 4 and FIG. 5.

Figure 4:
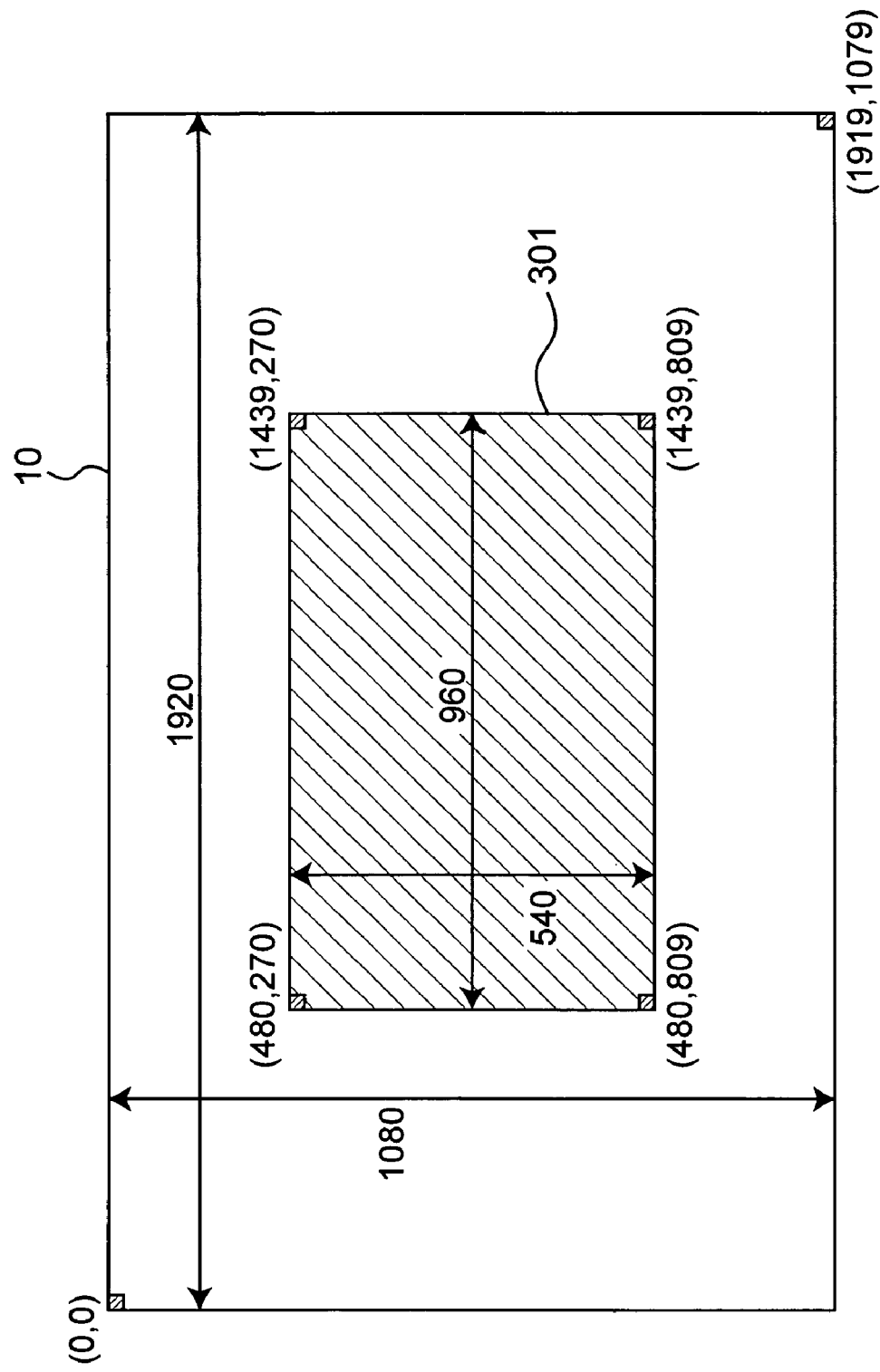
FIG. 4 shows the pixel arrangement of the image sensor when the rectangular area set by the area control unit has corner pixels at X-Y coordinates (480,270), (1439,270), (480,809), (1439,809)

In the example shown in FIG. 4, the shaded rectangular read area A 301 is defined by corner pixels at X-Y addresses (480,270), (1439,270), (480,809), (1439,809). The area surrounding read area A 301 is area B. In this example the area density control unit 40 set the density of pixels to be read from read area A 301 to 1, and set the pixel density in area B to ¼. Note that the total image sensor area is defined as area A and area B in this example.

Because the pixel density in area A is 1, all pixels in area A are read first. Furthermore, because the pixel density in area B is ¼, one of every four pixels is read in area B. Because all pixels in area A are read, the total number of pixels read is 960*540=518,400 pixels.

However, because only ¼ of the pixels in area B are read, the number of pixels read in area B is (1920*1080−960*540)/4=388,800 pixels.

As a result, a total 518,400+388,800=907,200 pixels are read from the image sensor, and 907,200 pixels are read to read one screen (frame).

Figure 5:
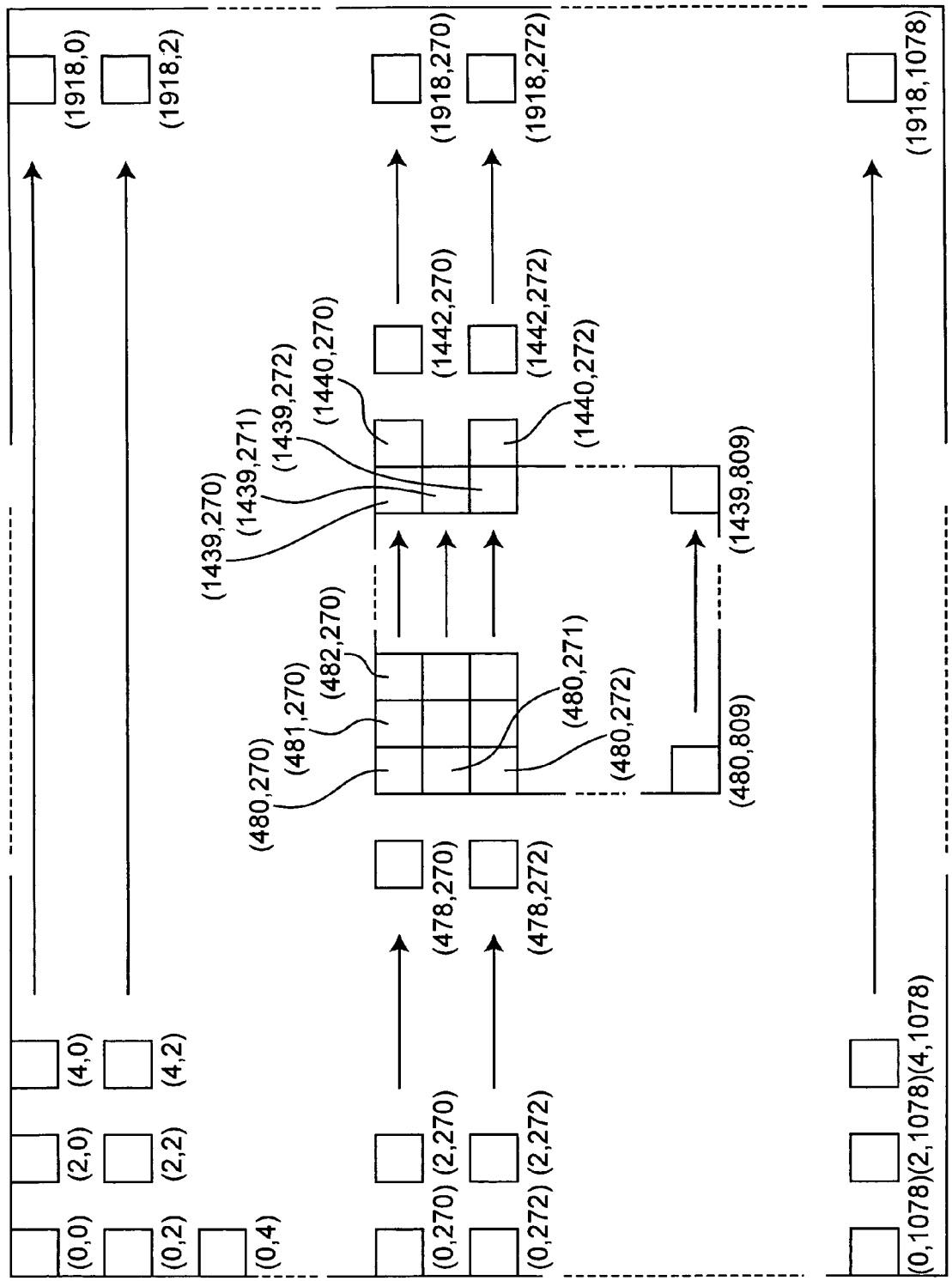
FIG. 5 shows the location of read and unread pixels in the area in FIG. 4 where the pixel density is set to ¼ by the area density control unit.

FIG. 5 shows the arrangement of pixels read from area A and area B. How signals are read from the pixels in area A and area B is described more specifically below with reference to FIG. 5.

At an internally generated read start pulse, the XY address control unit 20 starts outputting X-Y address signals, and the first X-Y address output in this example is (X,Y)=(0,0). The region including pixel (0,0) is in area B, and the pixel density specified for reading area B is ¼ as noted above. The XY address control unit 20 therefore waits the time required for the image sensor 10 to read out one pixel, and then outputs the address (X,Y)=(2,0). This operation repeats as the XY address control unit 20 increments the X address value by skipping every other pixel (column), thus outputting X-Y addresses (X,Y)=(4,0), (6,0) . . . , and so forth. After outputting the last address in this pattern on row Y=0, that is, (X,Y)=(1918,0), the Y address value is similarly incremented to Y=2, thus skipping one row. As a result, the next address output after (X,Y)=(1918,0) is (0,2). The address is thereafter incremented in the X direction as described above, and the XY address control unit 20 outputs (X,Y)=(2,2), (4,2), . . . (1918,2). The Y address value is then again incremented, skipping one row to Y=4, and the process repeats. By thus outputting the X-Y addresses in this pattern, one of every four pixels is read in area B.

Reading signals from area A is described next. Because every pixel in area A is read, the X-Y addresses output for reading area A address every pixel and do not skip any pixels. Therefore, after outputting (X,Y)=(478,270), the XY address control unit 20 outputs (480,270), (481,270) . . . (1439,270) in area A, and then (1440,270) in area B. Because pixel (1440, 270) is in area B, the next address is (1442,270), and addressing then continues in the ¼ pixel density pattern described above to the end of that row (Y=270). Because every pixel is read in area A, the next address after pixel (1918,270) in area B is (X,Y)=(480,271), and not (X,Y)=(0,272). After each pixel address in area A on line Y=271 has been output to (X,Y)=(1439,271), addressing continues from (X,Y)=(0, 272) in area B.

As a result, all pixels are read in area A by specifying all X-Y addresses inside area A, and one of every four pixels is read in area B by skipping every other X and Y address in area B.

Figure 6:
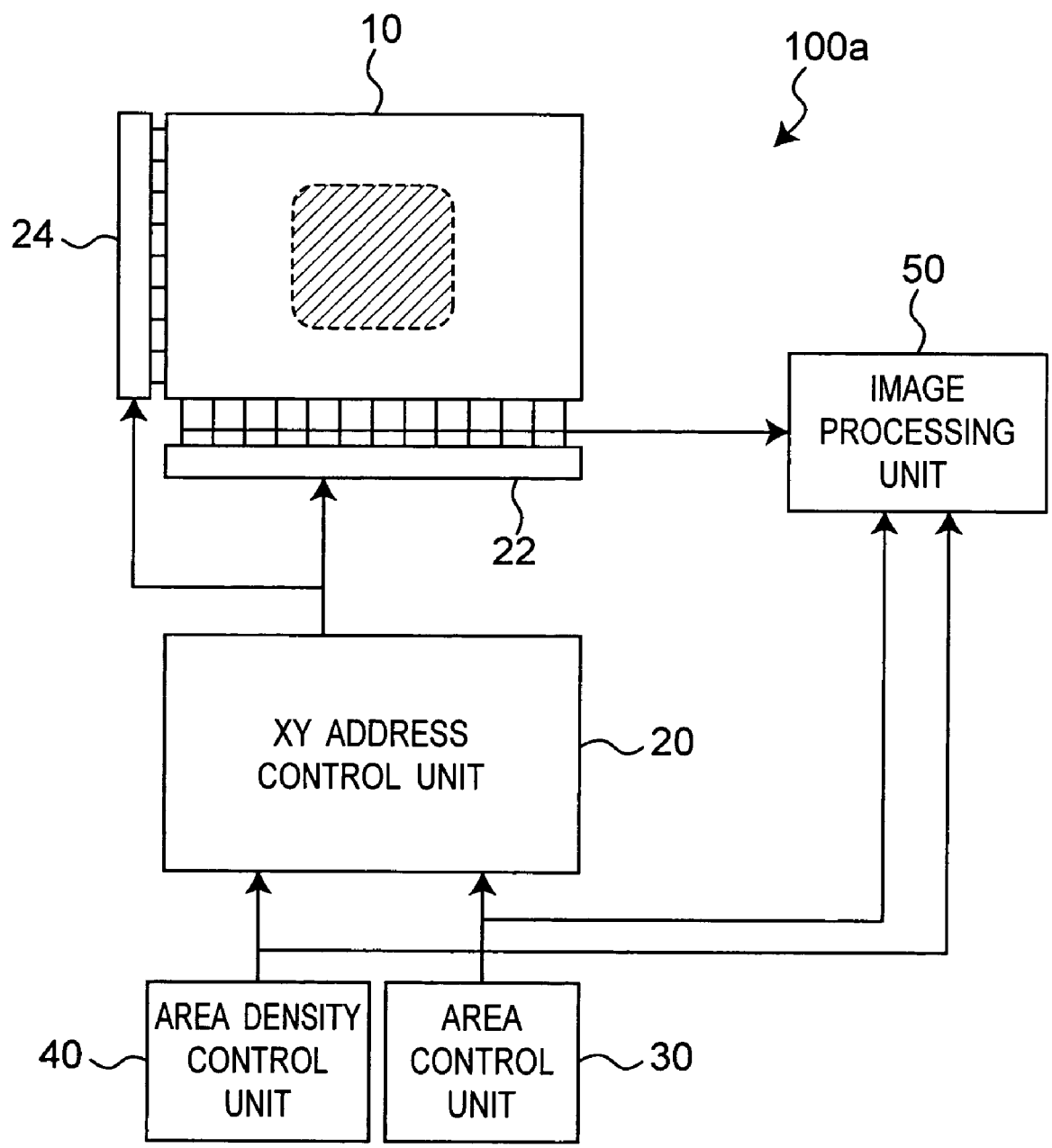
FIG. 6 is a block diagram of an imaging apparatus according to a variation additionally having an image processing unit.

FIG. 6 is a block diagram showing an imaging apparatus 100a also having an image processing unit 50. The image processing unit 50 applies a specific signal processing operation to the signals read from the image sensor 10, and outputs a video signal. More specifically, the image processing unit 50 converts the signals read from each area to a specific pixel density so that the pixel density of the signals read from all parts of the image sensor are adjusted to the same pixel density, and outputs a video signal. As a result, the image data read from the image sensor 10, and the values set by the area control unit 30 and area density control unit 40, are input to the image processing unit 50.

The image data read as described above is then processed by the image processing unit 50 and output as video data. However, if the image data is output as read, the resolution will be different in different parts of the image. The image processing unit 50 therefore converts the pixel density of the signals so that the output image has the same pixel density throughout the entire image area.

The method whereby the image processing unit 50 converts signals from different areas to the same specified pixel density so that the pixel density is the same specified pixel density throughout the image is described next with reference to FIG. 7.

Figure 7:
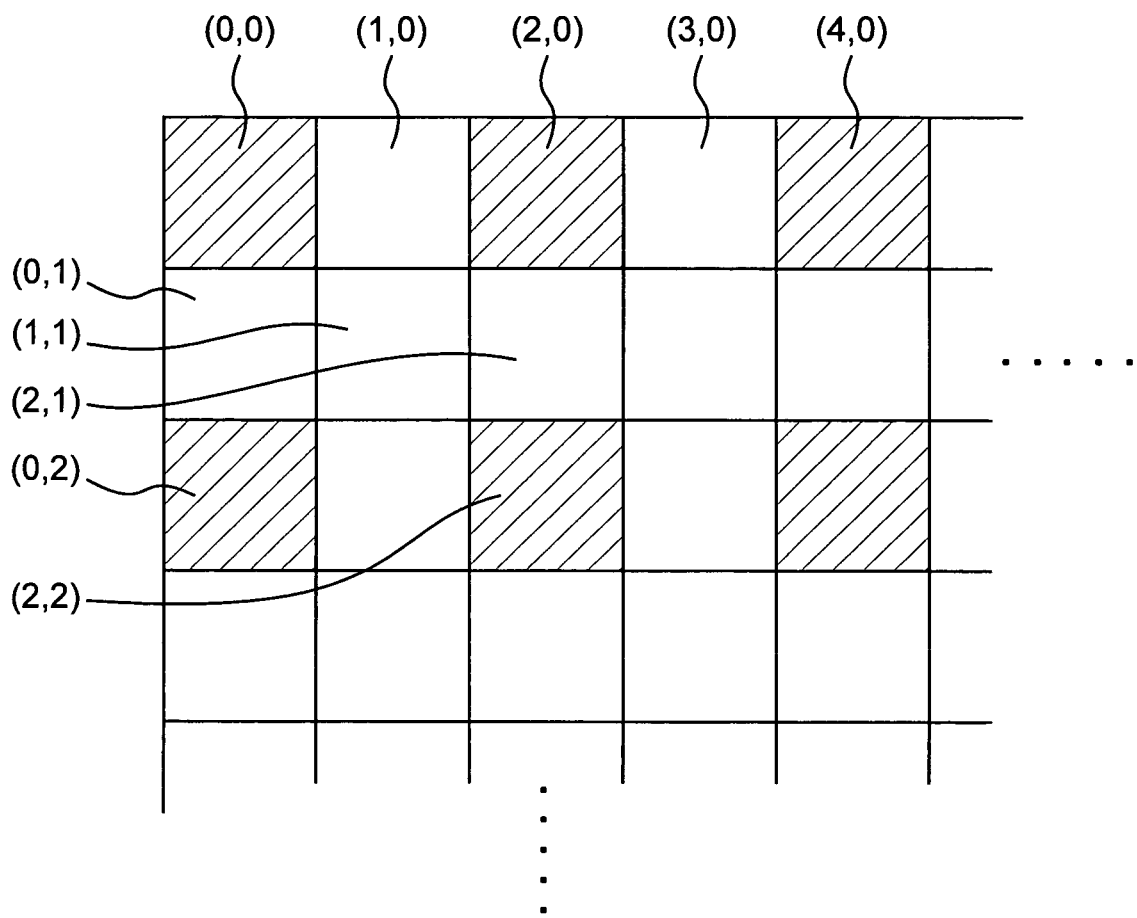
FIG. 7 is a schematic diagram of the arrangement of pixels read from the image sensor.

FIG. 7 is an enlarged view showing the arrangement of the read pixels in the neighborhood of (X,Y)=(0,0). In the foregoing example, the area control unit 30 defined area A as the rectangular region with corner pixels at X-Y addresses (480, 270), (1439,270), (480,809), (1439,809), and defined the area outside area A as area B. The area density control unit 40 set the pixel density in area A to 1, and the pixel density in area B to ¼. The pixels read in the area shown in FIG. 7 based on these conditions are thus (0,0), (2,0), (4,0), (0,2), (2,2), and so forth. The unread pixels are (1,0), (3,0), (0,1), (1,1), (2,1).

If the pixel density specified for the entire image area is 1, signal processing of the signals in area A is not needed because area A is read at pixel density=1. However, because the pixel density set for area B is ¼ and only one of every four pixels is read, the pixel density of the signals must be converted. The image processing unit 50 therefore interpolates the values of the pixels that were not read in area B.

Pixel signals can be interpolated by, for example, taking the average of the pixels on each side of a pixel that was not read. This is more fully described below.

(a) For the unread pixel (1,0), the average of the signals for pixel (0,0) and pixel (2,0) is calculated and used as the value of pixel (1,0). Pixel (3,0) is similarly interpolated by calculating the average of pixels (2,0) and (4,0).

(b) The average of the signals for pixels (0,0) and (0,2) is used as the value of unread pixel (0,1), and the average of the signals for pixels (2,0) and (2,2) is used as the value of unread pixel (2,1).

(c) The average of the four adjacent pixels (0,0), (2,0), (0,2), (2,2) is acquired as the value of pixel (1,1).

This process is repeated to interpolate the value of each unread pixel from the adjacent read pixels, and thereby output a signal for every pixel in the image area.

It will be obvious that interpolation shall not be limited to using the average of the adjacent pixel signals, and other interpolation methods can be used.

Figure 8:
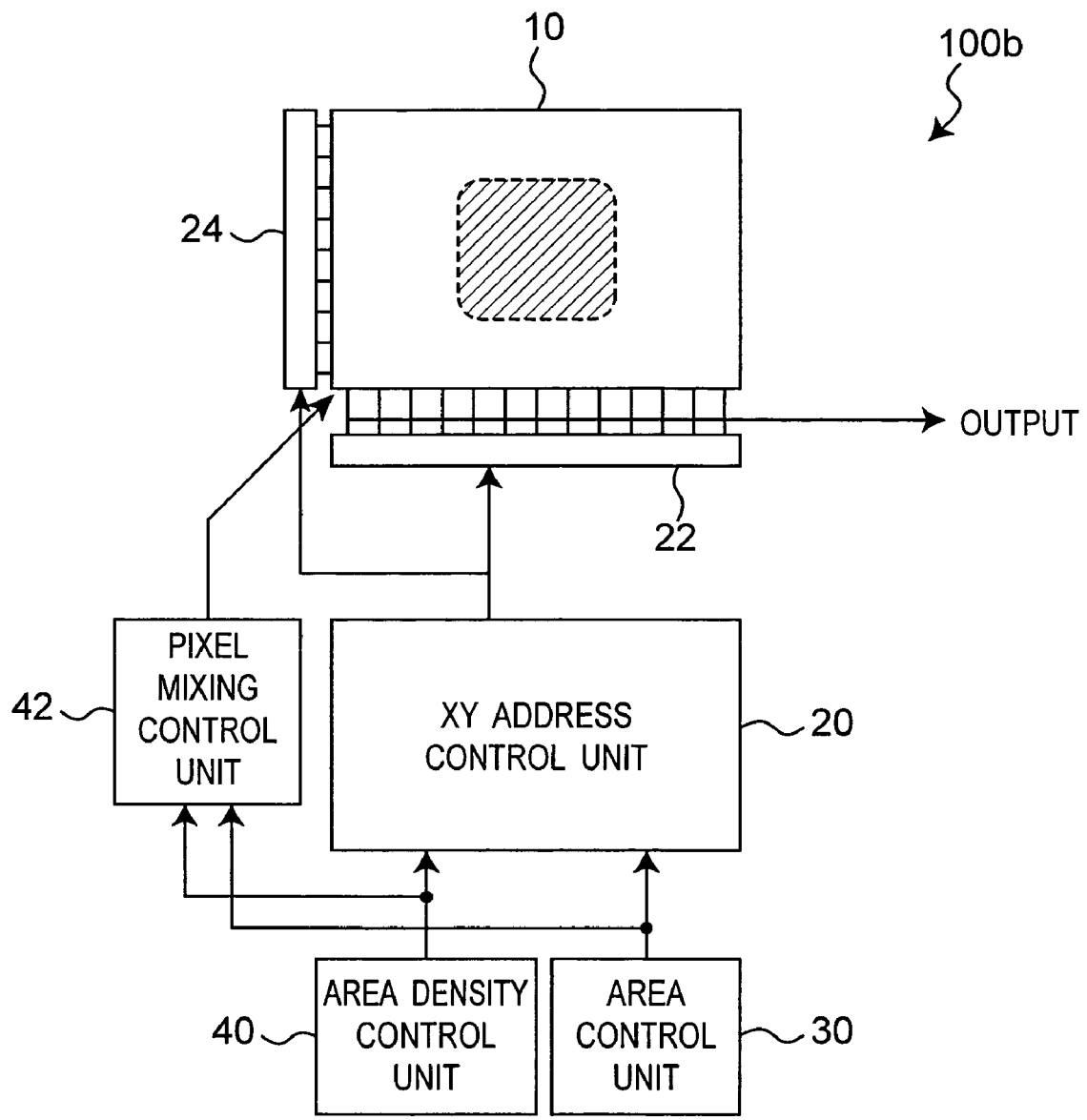
FIG. 8 is a block diagram of an imaging apparatus according to a variation having a pixel mixing control unit.

FIG. 8 is a block diagram of other imaging apparatus 100*b* including a pixel mixing control unit 42. When area density is specified except for 1 by the area control unit 30 and the area density control unit 40, the pixel mixing control unit orders to mix pixel signals. Then, the mixing the pixel signals is performed by CMOS sensor so that the output may correspond to the specified density of pixel and the pixel signal is output.

For example, as shown in FIG. 4, the area control unit 30 defined area A as the rectangular region with corner pixels at X-Y addresses (480, 270), (1439, 270), (480, 809), (1439, 809), and defined the area outside area A as area B. The area density control unit set the pixel density in area B to ¼. When reading pixel (0, 0) is ordered, data of pixel (0, 0), (0,1), (1, 0), (1, 1) are mixed to output.

Figure 9:
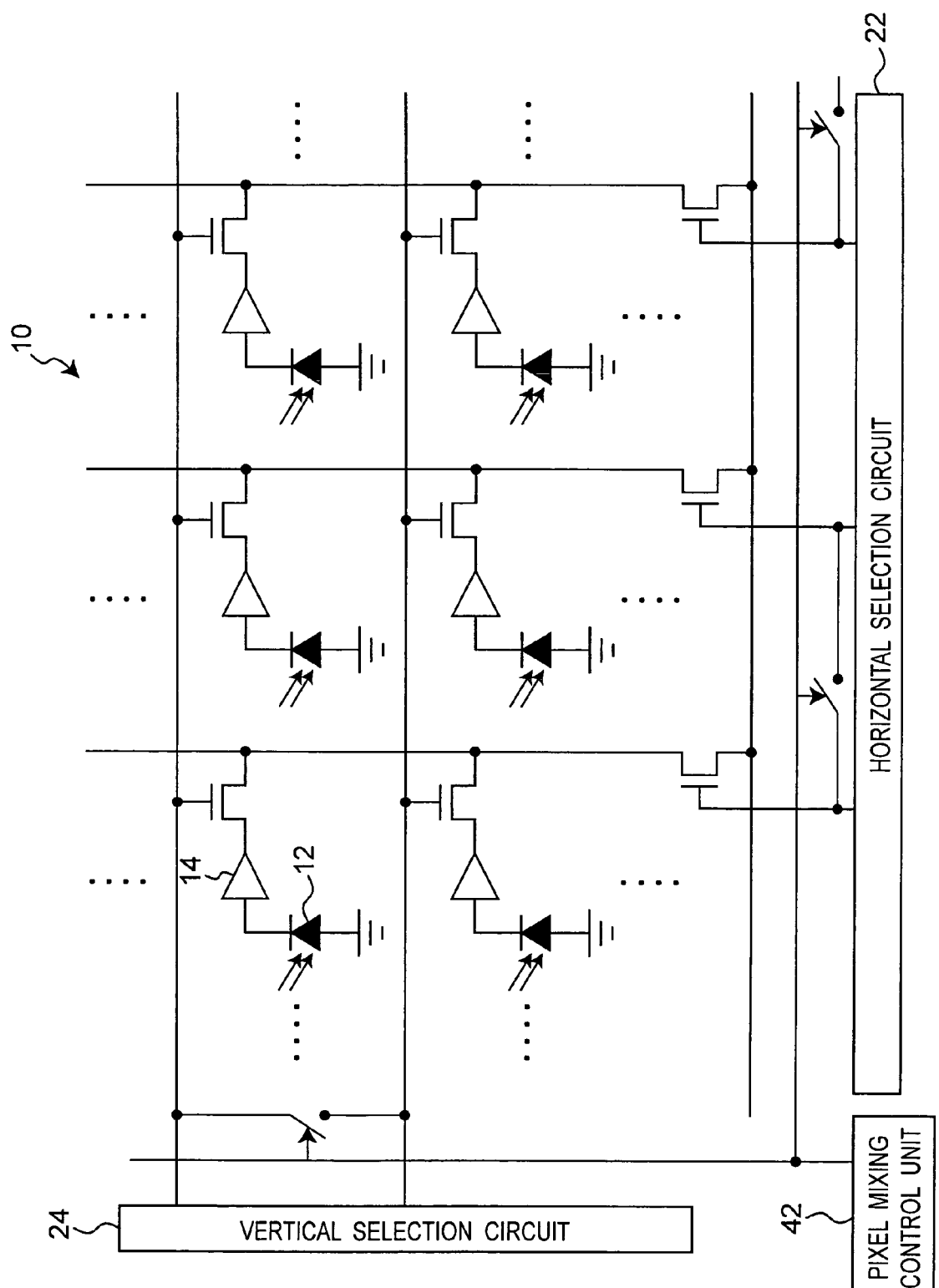
FIG. 9 is a schematic circuit diagram of the imaging apparatus of FIG. 8.

FIG. 9 is a schematic circuit diagram of the imaging apparatus having the pixel mixing control unit 42. When pixel mixing is ordered, row lines and column lines are selected alternately in the image sensor. Then, when reading specified pixel, two-by-two pixel blocks including the specified pixel are selected and the data of pixels in the two-by-two pixel blocks are summed to output.

Figure 10:
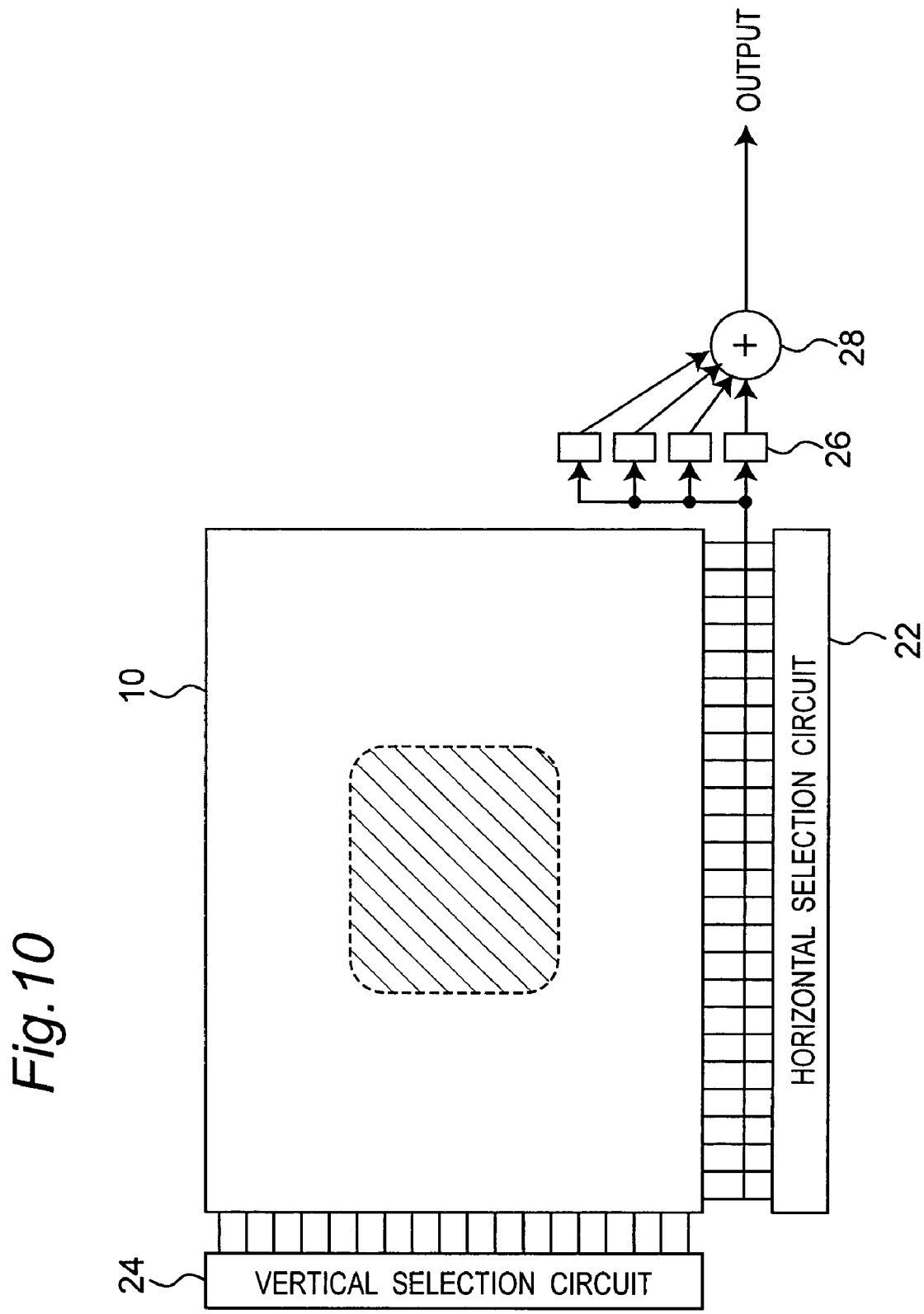
FIG. 10 is a schematic circuit diagram of the imaging apparatus according to a variation having a pixel mixing unit.

FIG. 10 is a schematic circuit diagram of the imaging apparatus according to variation having a pixel mixing unit 28. As above stated, the area control unit 30 defined area A as the rectangular region with corner pixels at X-Y addresses (480, 270), (1439, 270), (480, 809), (1439, 809), and defined the area outside area A as area B, as shown in FIG. 4. The area density control unit set the pixel density in area B to ¼. When reading pixel (0, 0) is ordered, data of pixel (0, 0), (0, 1), (1, 0), (1, 1) are read successively and in order to store in a pixel data buffer 26. After the data are stored completely, the data from the pixel data buffer 26 are mixed to output.

As described above, the area control unit 30 specifies an area in the imaged subject, and the area density control unit 40 sets the density of the pixels to be read in that area high. Since the other area not specified by the area control unit 30, which includes no imaged subject, is less interest, the density of the pixels to be read in the other area may be set low. Thus, the read time can be shortened and the frame rate can be increased, because all pixels are not read.

In addition, a video image with high resolution overall can be acquired by converting signals in the low resolution image area to the same resolution used in the high resolution image area.

Figure 11:
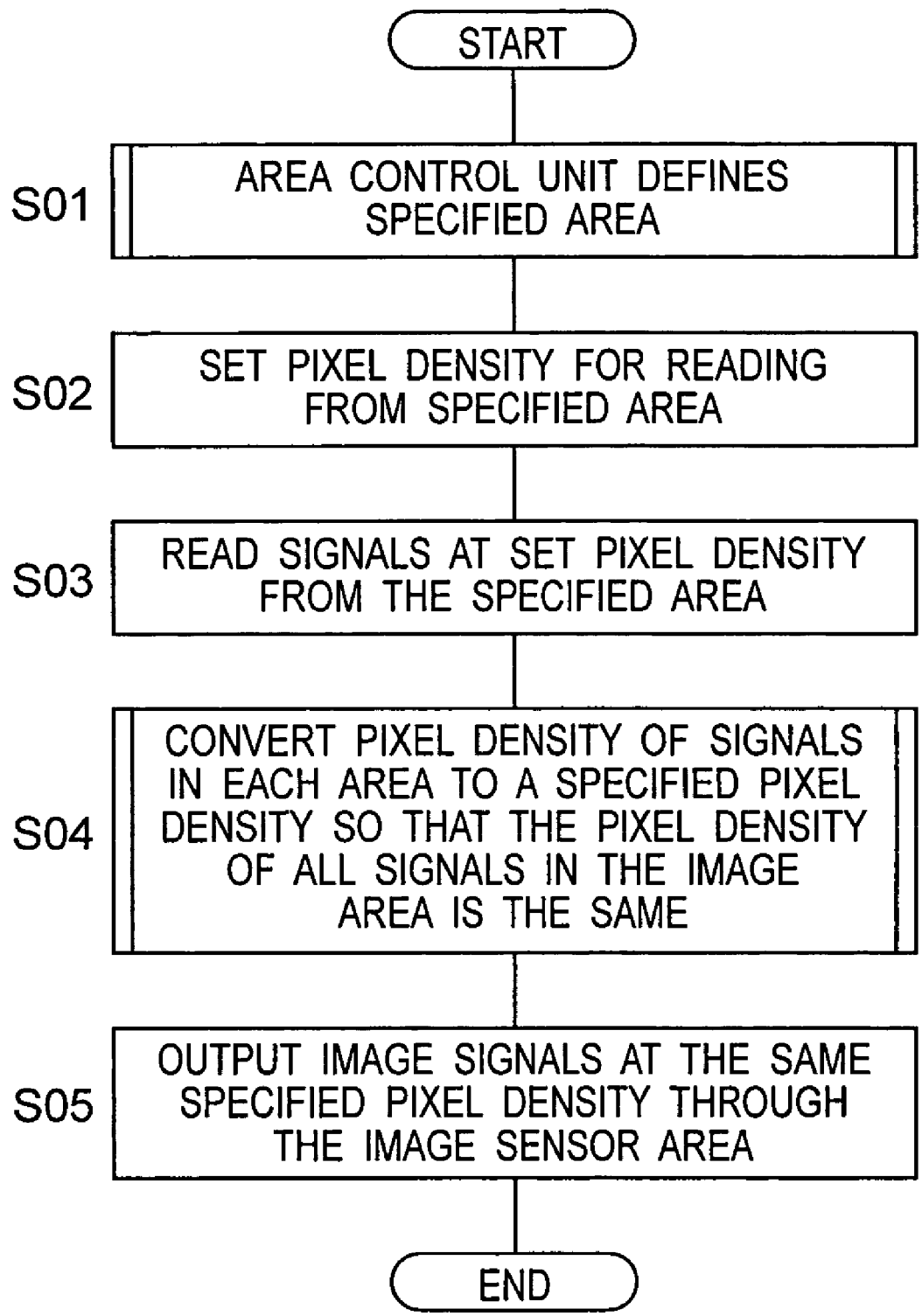
FIG. 11 is a flow chart of an imaging method according to a first embodiment of the present invention.

An imaging method according to this embodiment of the present invention is described next below with reference to the flow charts in FIG. 11 and FIG. 12. FIG. 11 is a flow chart of the imaging method according to this first embodiment of the invention.

(a) The area control unit 30 sets a specified area containing a plurality of pixels (S01). A plurality of specified areas could be set within the overall image area.

(b) The area density control unit 40 then sets the density of the pixels to be read from the specified area(s) (S02). As described above, for example, if the pixel density is 1, all pixels in the specified area are read; if the pixel density is ¼, one of every four pixels is read.

(c) Signals are then read and output at the specified pixel density from the pixels in the specified area (S03).

(d) The image processing unit 50 then converts the pixel density of the signals in each area to a specified pixel density so that the pixel density of signals throughout the image area is the same specified pixel density (S04). This step (S04) is described further below.

(e) Image signals at the same specified pixel density throughout the imaging area of the image sensor 10 are then output (S05).

Figure 12:
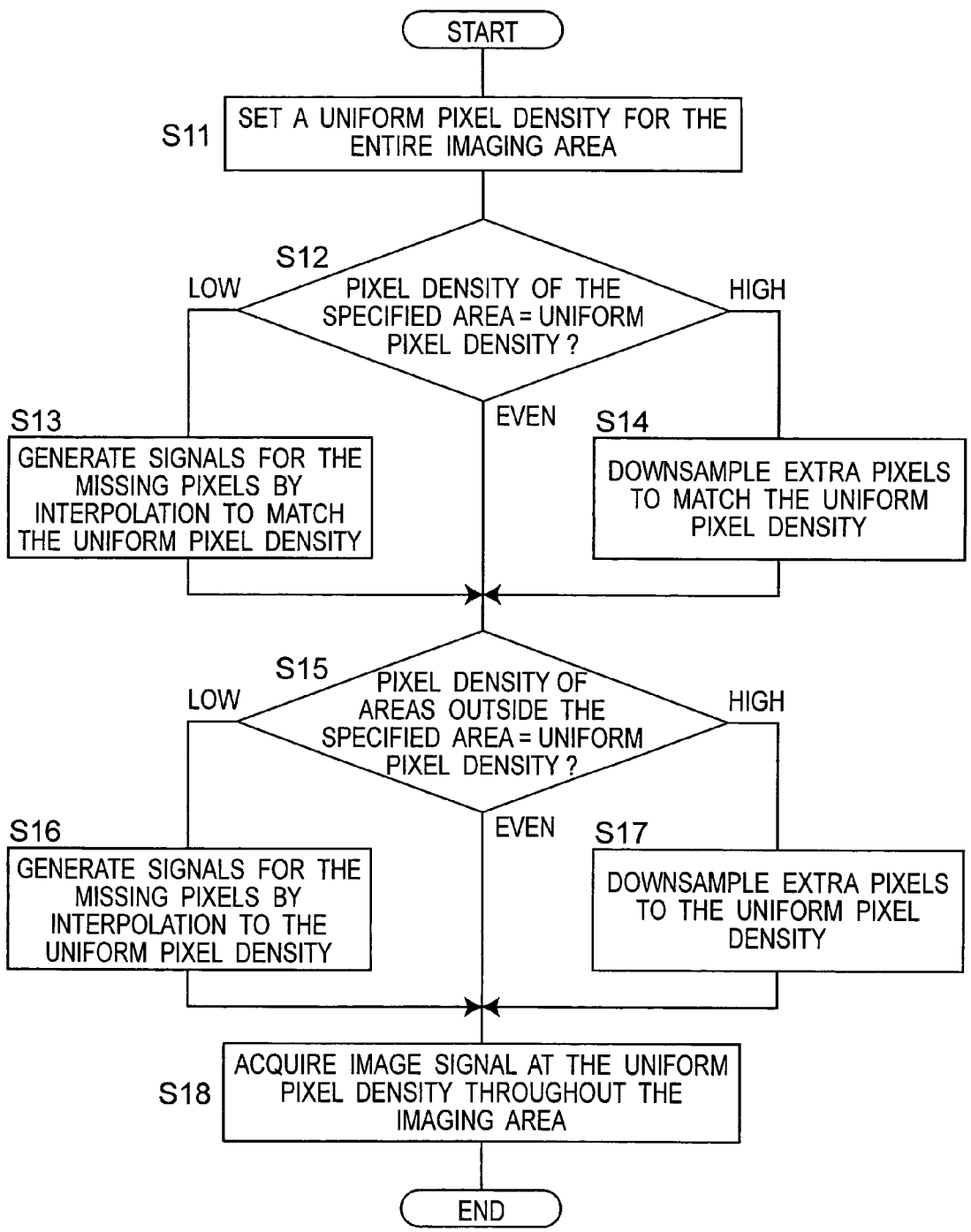
FIG. 12 is a flow chart showing step S04 in FIG. 11 in detail.

FIG. 12 is a detailed flow chart of step S04 in FIG. 11.

(i) A specified uniform pixel density is set for the entire image area (S11).

(ii) Whether the signals read from the specified area are read at the same pixel density as the uniform pixel density is then determined (S12). If the pixel density is the same, operation goes to step S15.

(iii) If the pixel density of the signals in the specified area is lower than the uniform pixel density, signals for the missing pixels are interpolated to achieve the same uniform pixel density (S13). This interpolation shall not be limited to taking the average of the pixel signals on both sides of the missing pixels. Interpolation using a higher linear function or other function could be used instead. Operation then proceeds from step S15.

(iv) If the pixel density of the signals in the specified area is higher than the uniform pixel density, the signals are downsampled to the uniform pixel density (S14). Operation then proceeds from step S15.

(v) Whether the signals read from the area outside the specified area are read at the same pixel density as the uniform pixel density is then determined (S15). If the pixel density is the same, operation goes to step S18.

(vi) If the pixel density of the signals outside the specified area is lower than the uniform pixel density, signals for the missing pixels are interpolated to achieve the same uniform pixel density (S16). Operation then proceeds from step S18.

(vii) If the pixel density of the signals outside the specified area is higher than the uniform pixel density, the signals are downsampled to the uniform pixel density (S17). Operation then proceeds from step S18.

(viii) An image signal having the same uniform pixel density throughout the image area is acquired (S18).

(First Variation)

Figure 13:
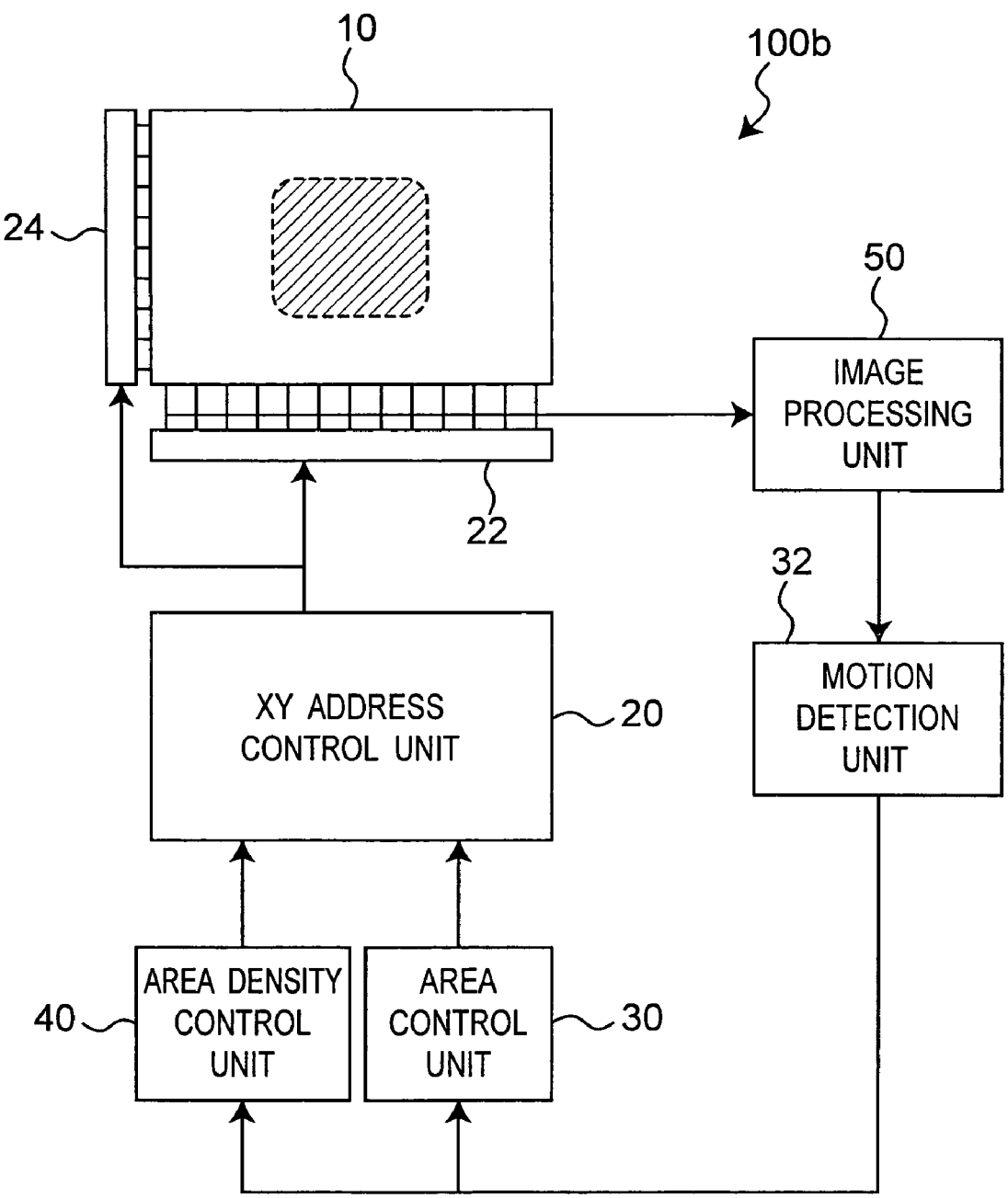
FIG. 13 is a block diagram of an imaging apparatus according to a variation additionally having a motion detection unit.

An imaging apparatus 100*b* according to a first variation of this first embodiment is described next with reference to FIG. 13. FIG. 13 is a block diagram showing a imaging apparatus 100*b* that also has a motion detection unit 32. This imaging apparatus 100*b* differs from the imaging apparatus described above in that the imaging apparatus 100*b* also has a motion detection unit 32. In this imaging apparatus 100b, the area containing a moving subject detected by the motion detection unit 32 is the area specified by the area control unit 30.

The signal processing operation of the motion detection unit 32 is described next.

(a) The video signal (image data) already processed by the image processing unit 50 is input to the motion detection unit 32.

(b) The motion detection unit 32 detects the difference between frames in a specified small area containing a plurality of pixels. This frame difference could be acquired for each pixel.

(c) If the average difference between frames for the pixel signals in the small area is greater than a threshold value σ1, that small area is known to contain a moving subject. If the difference is less than or equal to threshold value σ1, the subject is not moving, that is, that image area is a still image.

(d) A rectangular area containing numerous small areas containing a moving subject is then extracted, and the corner coordinates of this rectangular area are output to the area control unit 30 and area density control unit 40.

(e) The area control unit 30 sets the area identified by the motion detection unit 32 as the specified area. The area density control unit 40 sets the pixel density so that the area containing the moving subject is read at a high pixel density.

(f) The XY address control unit 20 generates the X-Y addresses of the pixels to be read based on the information supplied from the area control unit 30 and area density control unit 40, and thus controls reading pixels from the image sensor 10.

It is noted that the image processing unit 50 may form an image in which density of each pixel of whole areas correspond to the minimum density. Then, the image may be input to the detection unit 32 as input video signal.

Because the pixel density of the input video signal is minimum density, the amount of the input video signal can be reduced so that processing volume can be reduced in the motion detection unit 32.

The image in which density of each pixel of whole areas correspond to the minimum density may be formed by thinning the pixels. For example, when the minimum density is ¼, with respect to the right upper corner pixels in FIG. 3, data of pixels (1, 0), (0, 1), (1, 1) are thinned and data of pixel (0, 0) is only used for forming the image.

The image in which density of each pixel of whole areas correspond to the minimum density may be formed by averaging the pixels adjacent each other. For example, when the minimum density is ¼, with respect to the right upper corner pixels in FIG. 3, data of pixels (0, 0), (1, 0), (0, 1), (1, 1) are averaged. Then, the average data is used as pixel signal.

The effect of the area control unit 30 defining the area containing the moving subject detected by the motion detection unit 32 as the specified area to be read at a specified pixel density is described next.

The part of an image containing motion is usually the subject of interest, such as a person. By increasing the pixel density in the image area where there is motion, the resolution of the main subject can be increased, and an image that appears to have high resolution overall can be acquired.

An apparently high resolution image can also be acquired by lowering the pixel density in the area containing the moving subject detected by the motion detection unit 32, and raising the pixel density in the areas not containing a moving subject, that is, areas where there is little motion. The part of a motion picture where there is rapid motion cannot be seen sharply by the viewer, and lowering the resolution in that area thus has little apparent effect on image quality. As a result, an image that appears to have high resolution overall can be acquired by lowering the pixel density in the area containing motion and raising the pixel density in the other areas so that the still image areas are sharp.

Figure 14:
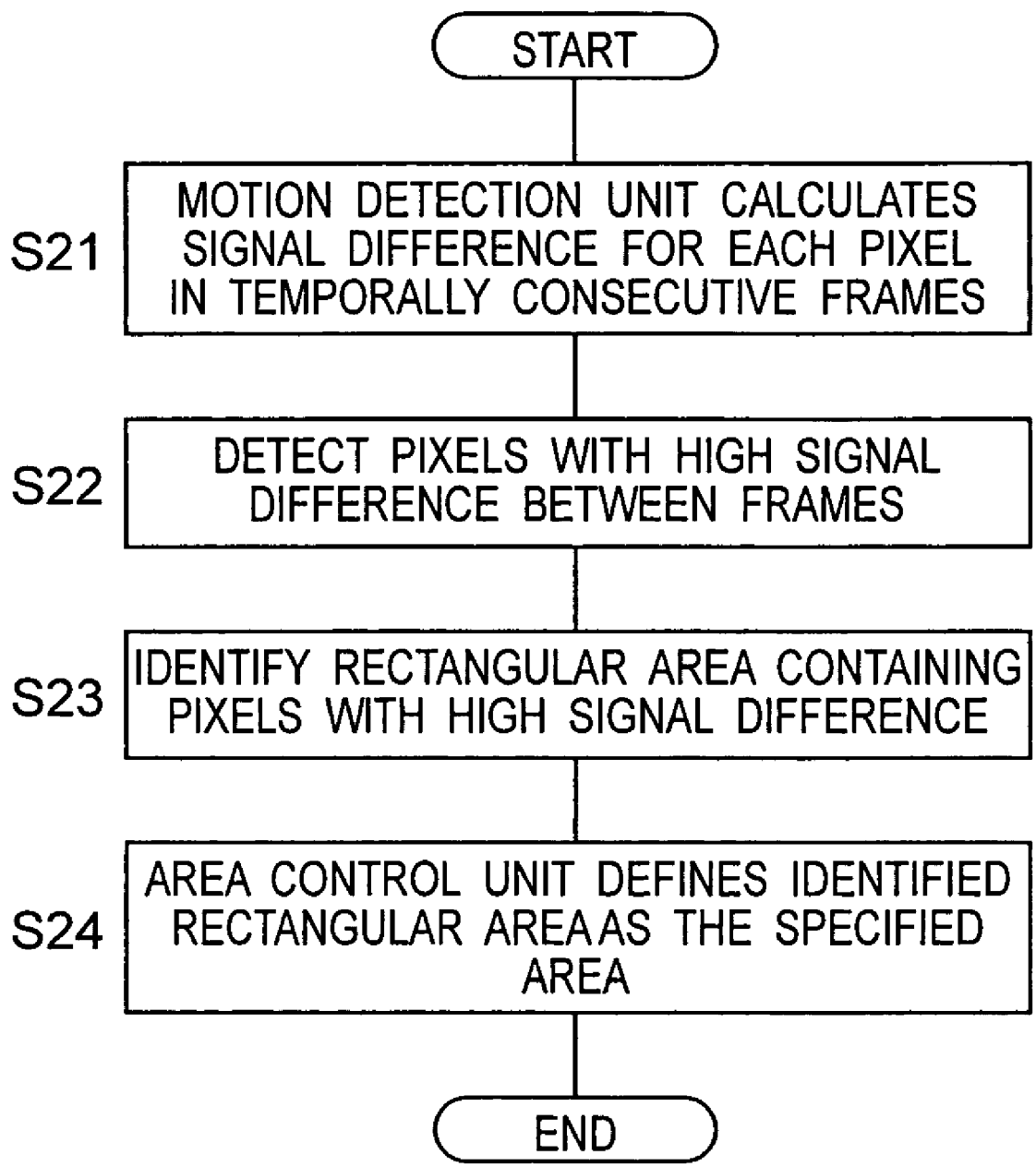
FIG. 14 is a flow chart of the process whereby the area containing a moving subject detected by motion detection is defined as the specified area by the area control unit in step S01 in FIG. 11.

FIG. 14 is a flow chart of the process whereby the area containing a moving subject detected by the motion detection unit 32 is defined as the specified area by the area control unit 30.

(i) The motion detection unit 32 acquires the difference between each pixel signal in temporally consecutive frames (S21).

(ii) Pixels with a large signal difference between frames are detected (S22).

(iii) The rectangular area containing pixels with a large signal difference are identified (S23). In this example this rectangular area is a single area containing an overall grouping of pixels with a large signal difference between frames, but a set of multiple small rectangular areas each containing pixels with a large signal difference could alternatively be defined.

(iv) The rectangular area identified by the motion detection unit 32 is then set as the specified area by the area control unit 30 (S24).

(Second Variation)

Figure 15:
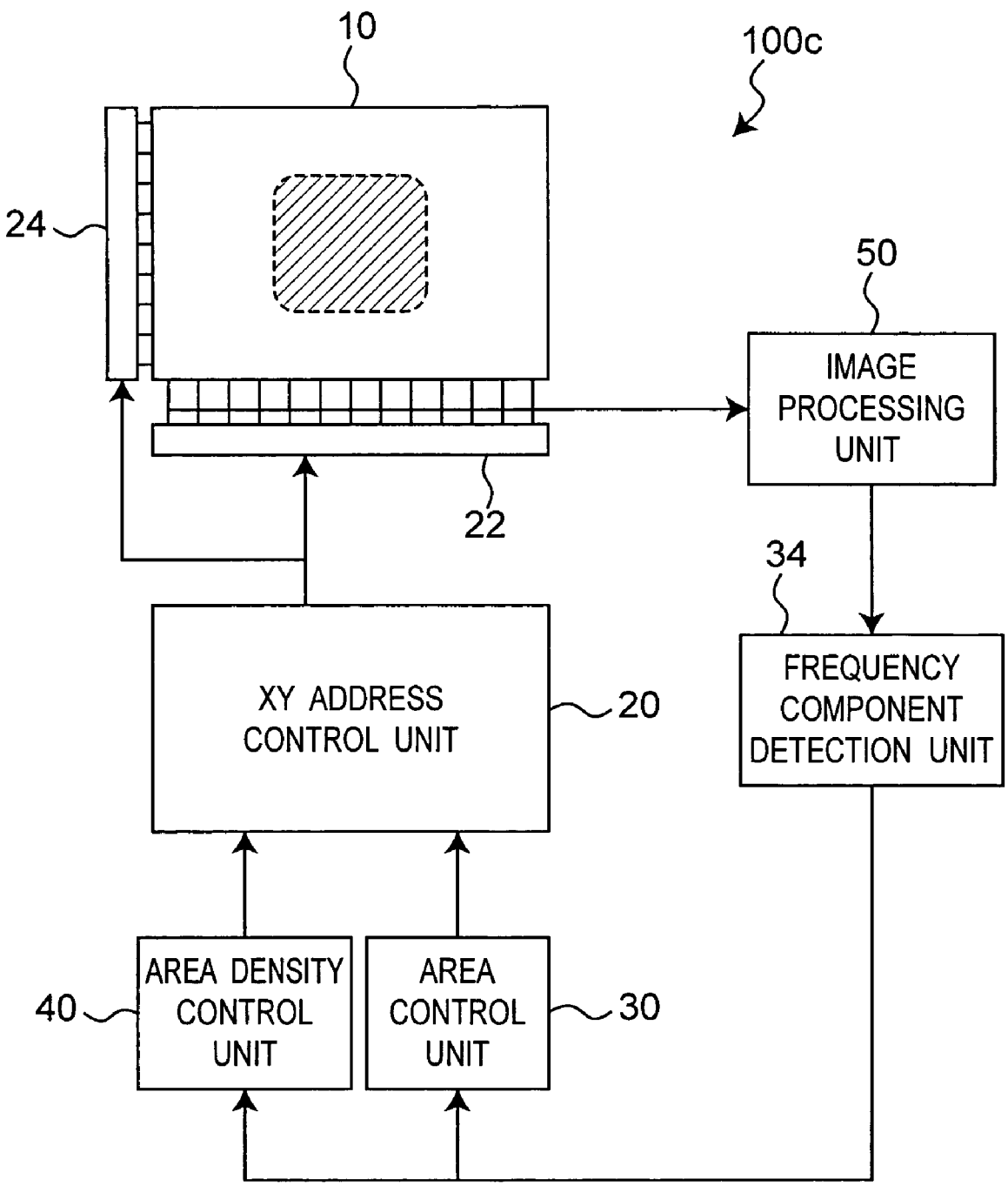
FIG. 15 is a block diagram of an imaging apparatus according to a variation additionally having a frequency component detection unit.

An imaging apparatus 100c according to a second variation of the invention is described next with reference to FIG. 15. FIG. 15 is a block diagram of this imaging apparatus 100c, which additionally has a frequency component detection unit 34. This imaging apparatus 100c differs from the first imaging apparatus 100 described above in additionally having a frequency component detection unit 34. The area containing a moving subject detected by the frequency component detection unit 34 is the specified area defined by the area control unit 30 in this imaging apparatus 100c.

Signal processing by the frequency component detection unit 34 is described next.

(a) The video signal (image data) already processed by the image processing unit 50 is input to the frequency component detection unit 34.

(b) The frequency component detection unit 34 processes the image signals in one frame to identify the area containing pixels having a high frequency component. More specifically, a high pass filter is used to cut all low frequency components below a threshold frequency F, leaving only the high frequency components.

(c) A rectangular area containing high frequency components is then extracted, and the corner coordinates of this rectangular area are output to the area control unit 30 and area density control unit 40.

(d) The area control unit 30 sets the area identified by the frequency component detection unit 34 as the specified area. The area density control unit 40 sets the pixel density so that this area is read at a high pixel density.

(e) The XY address control unit 20 generates the X-Y addresses of the pixels to be read based on the information supplied from the area control unit 30 and area density control unit 40, and thus controls reading pixels from the image sensor 10.

The effect of the area control unit 30 defining the area containing the high frequency components detected by the frequency component detection unit 34 as the specified area to be read at a specified pixel density is described next.

High frequency components generally appear along image edges. Therefore, by identifying the area containing high frequency components and reading pixels from this area at a high pixel density, an image with clearly defined edges can be acquired.

Figure 16:
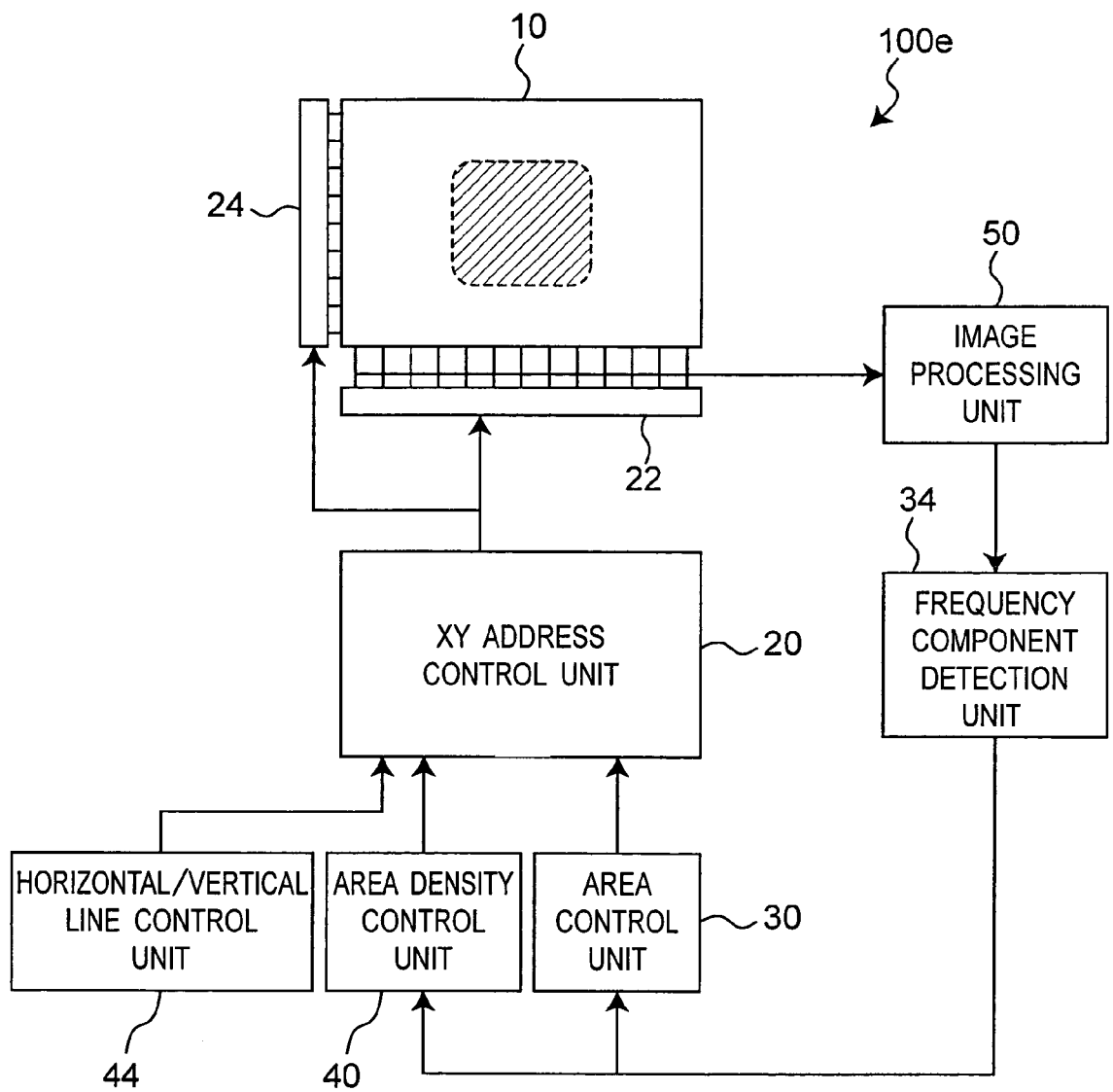
FIG. 16 is a block diagram of an imaging apparatus according to second variation having horizontal line/vertical line control unit.

FIG. 16 is a block diagram of an imaging apparatus 100d according to second variation having horizontal line/vertical line control unit. The horizontal line/vertical line control unit specifies horizontal line and/or vertical line. The whole pixels included in horizontal lines and vertical lines are read at each frame. Preferably, horizontal line/vertical line may be specified uniformly over the whole screen.

For example, when the horizontal line/vertical line control unit specifies horizontal lines every 20 lines and/or vertical lines every 10 lines over full-HD screen (1920*1088), then, the specified horizontal lines are listed as 1-th line, 21-th line, 41-th line, . . . 1081-th line from the top, and the specified vertical lines are listed as 1-th line, 11-th line, 21-th line, . . . , 1911-th line from the left.

The specified horizontal lines and/or vertical lines are read to output to the frequency component detection unit 34 through the image processing unit 50. The frequency detection unit 34 detects high-frequency component included in the input horizontal line and/or vertical line.

The effect of inputting data of whole pixels read from horizontal line and/or vertical line into the frequency component detection unit 34 is described next.

High frequency components generally appear along image edges. When thinning pixels or mixing pixels is ordered by the area density control unit 40, the high frequency component in image edges may be weakened. Then, detection accuracy of the image edges may be fluctuated according to the pixel density. Therefore, when high frequency components are detected by the frequency detection unit 34, detection condition should be uniform over the whole screen so as to detect image edges impartially over whole screen.

Figure 17:
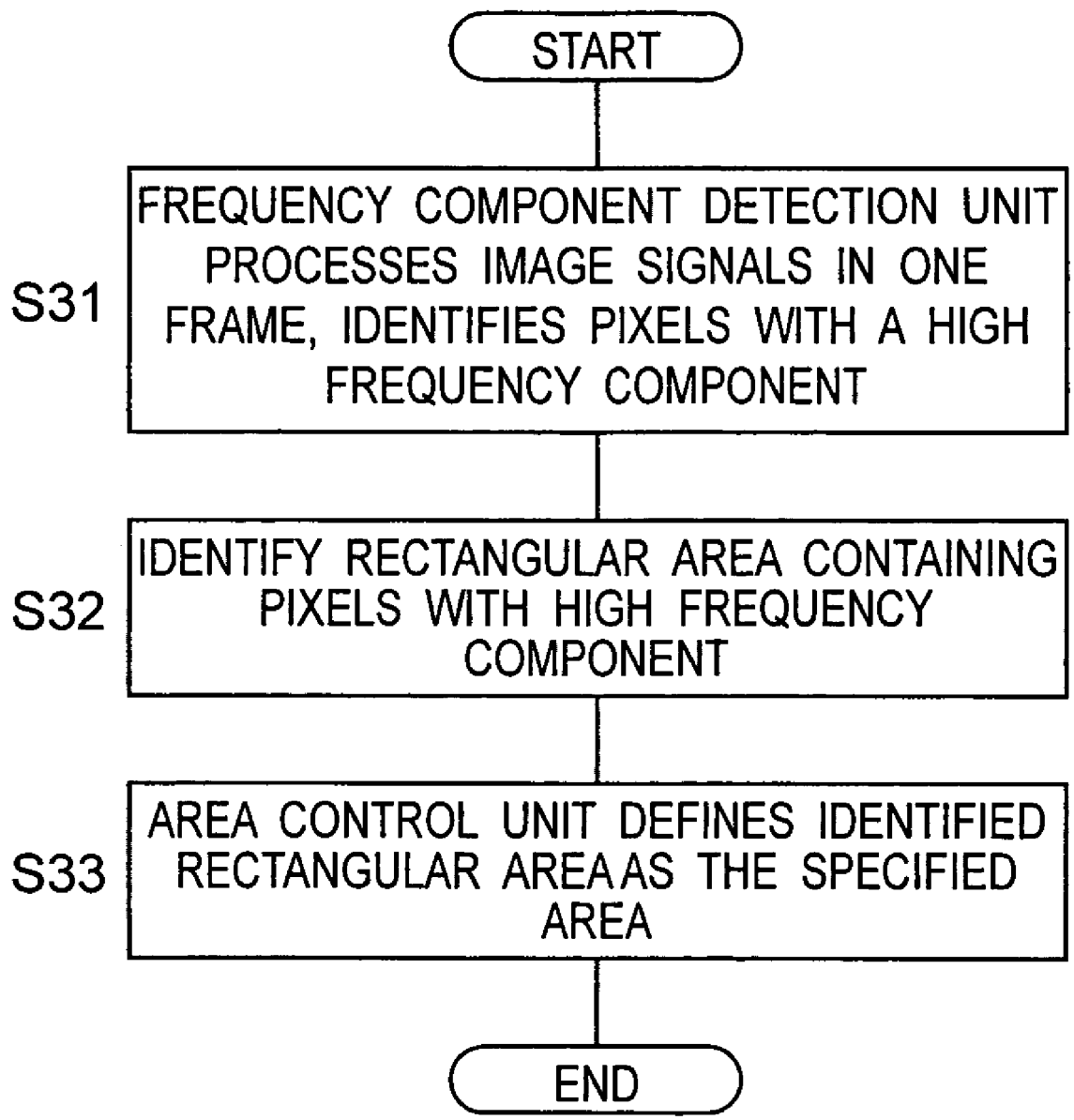
FIG. 17 is a flow chart of the process whereby the area containing image edges as a result of high frequency component detection is defined by the area control unit as the specified area in step S01 in FIG. 11.

FIG. 17 is a flow chart of the process whereby the area containing image edges as a result of high frequency component detection is defined by the area control unit 30 as the specified area.

(i) The frequency component detection unit 34 processes one frame of image signals to identify the areas with a high frequency component (S31).

(ii) The area containing these areas with a high frequency component is then extracted as a rectangular area (S32). In this example this rectangular area is a single area containing areas with a high frequency component, but a set of multiple small rectangular areas each having a high frequency component could alternatively be defined.

(iii) The identified rectangular area is then set as the specified area by the area control unit 30 (S32).

(Third Variation)

Figure 18:
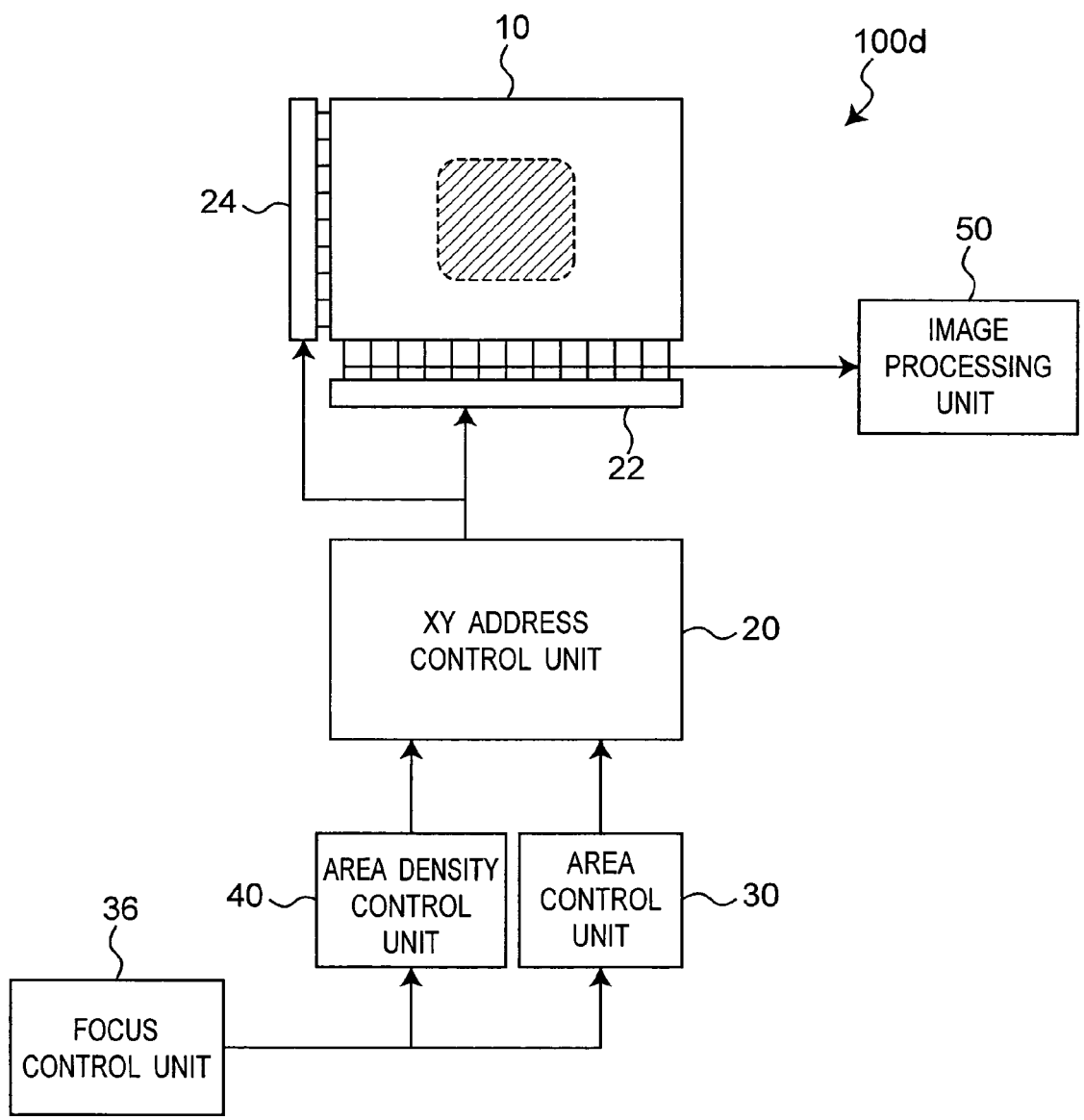
FIG. 18 is a block diagram of an imaging apparatus according to a variation additionally having a focus control unit.

An imaging apparatus 100d according to a third variation of the invention is described next with reference to FIG. 18. FIG. 18 is a block diagram of this imaging apparatus 100d, which additionally has a focus control unit 36. This imaging apparatus 100d differs from the first imaging apparatus 100 described above in additionally having a focus control unit 36. The area containing the rangefinding point used by the focus control unit 36 to adjust the focus is the specified area defined by the area control unit 30 in this imaging apparatus 100d.

Signal processing by the focus control unit 36 is described next.

(a) The focus control unit 36 extracts the rectangular area containing the pixels at the rangefinding point. The focus control unit 36 controls focusing for the camera system, and the rangefinding area used for adjusting the focus can be defined automatically or manually by the operator. Some camera systems may have the rangefinding area fixed in the center of the lens. The size of the rectangular area containing the pixels at the rangefinding point is predefined. The size of this rectangular area could, however, be adjustable.

(b) The focus control unit 36 then outputs the coordinates of the extracted rectangular area to the area control unit 30 and area density control unit 40.

(c) The area control unit 30 sets the area identified by the focus control unit 36 as the specified area. The area density control unit 40 sets the pixel density so that this area is read at a high pixel density.

(d) The XY address control unit 20 generates the X-Y addresses of the pixels to be read based on the information supplied from the area control unit 30 and area density control unit 40, and thus controls reading pixels from the image sensor 10.

The effect of the area control unit 30 defining the area containing the rangefinding point extracted by the focus control unit 36 as the specified area to be read at a specified pixel density is described next.

The focal area containing the rangefinding point at which the lens is focused usually contains the main subject. Therefore, by increasing the pixel density of the area surrounding the rangefinding point, the resolution of the main subject can be increased, and the resulting image appears overall to be a high resolution image.

Figure 19:
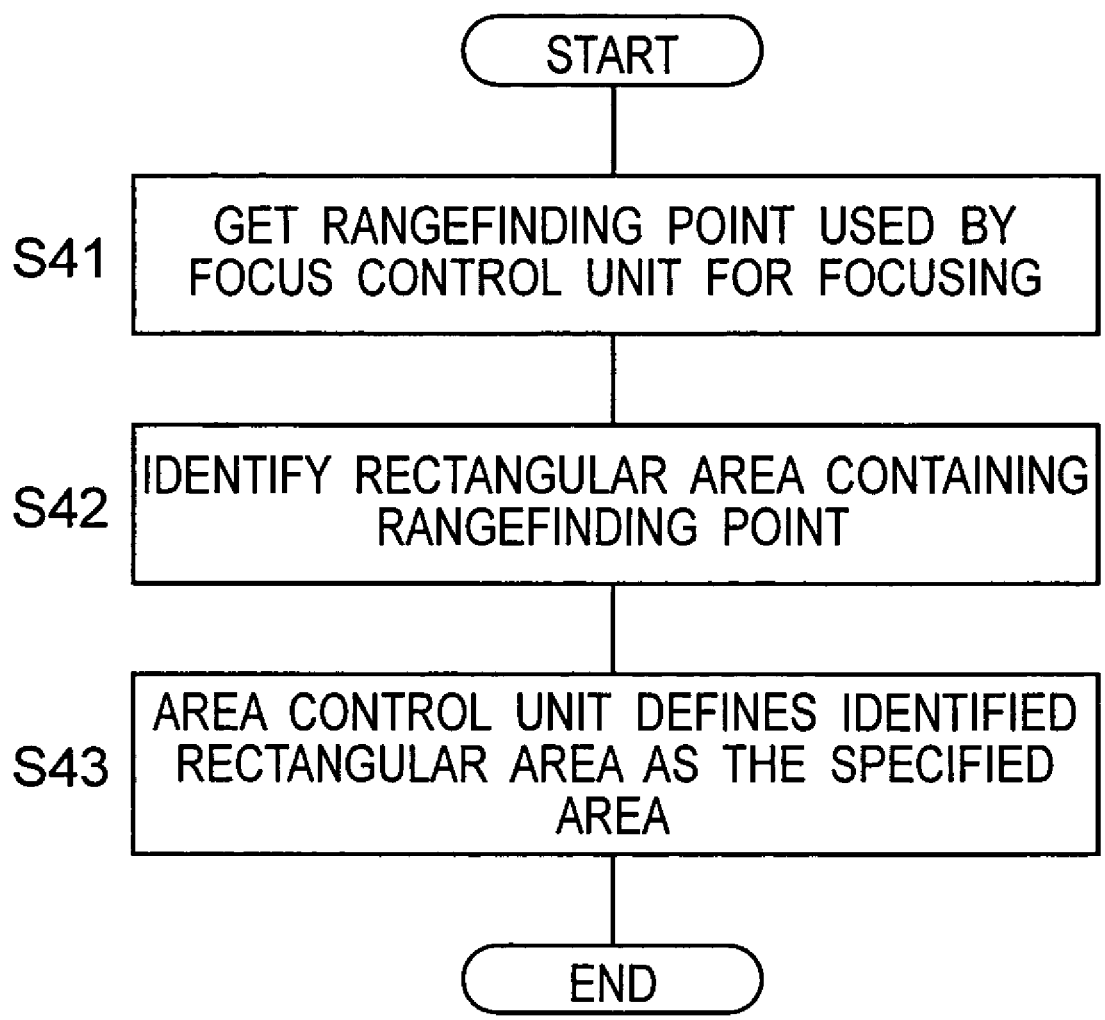
FIG. 19 is a flow chart of the process whereby the area containing the rangefinding point used for focusing is set as the specified area by the area control unit in step S01 in FIG. 11.

FIG. 19 is a flow chart of the process whereby the area containing the rangefinding point used for focusing becomes the specified area defined by the area control unit 30.

(i) The rangefinding point used for adjusting the focus by the focus control unit 36 is first acquired (S41).

(ii) The rectangular area containing the pixels at the rangefinding point are identified (S42). The size of the rectangular area containing the pixels at the focal distance is predefined in this example, but other methods could additionally be used to adjust the size of this area to include all of the subject.

(iii) The extracted rectangular area is then defined by the area control unit 30 as the specified area (S43).

Embodiment 2

An imaging apparatus according to a second embodiment of the present invention is described next with reference to FIG. 20 to FIG. 23. This imaging apparatus 200 differs from the imaging apparatus of the first embodiment in pre-segmenting the total area of the image sensor 10a into a plurality of areas (area 0 to area 11 in this example), and the area density control unit 40 setting the density of pixels read from each area. The imaging apparatus 200 of this embodiment thus differs from the first imaging apparatus 100 described above in not having an area control unit because the total image area is already segmented into a plurality of areas.

Figure 20:
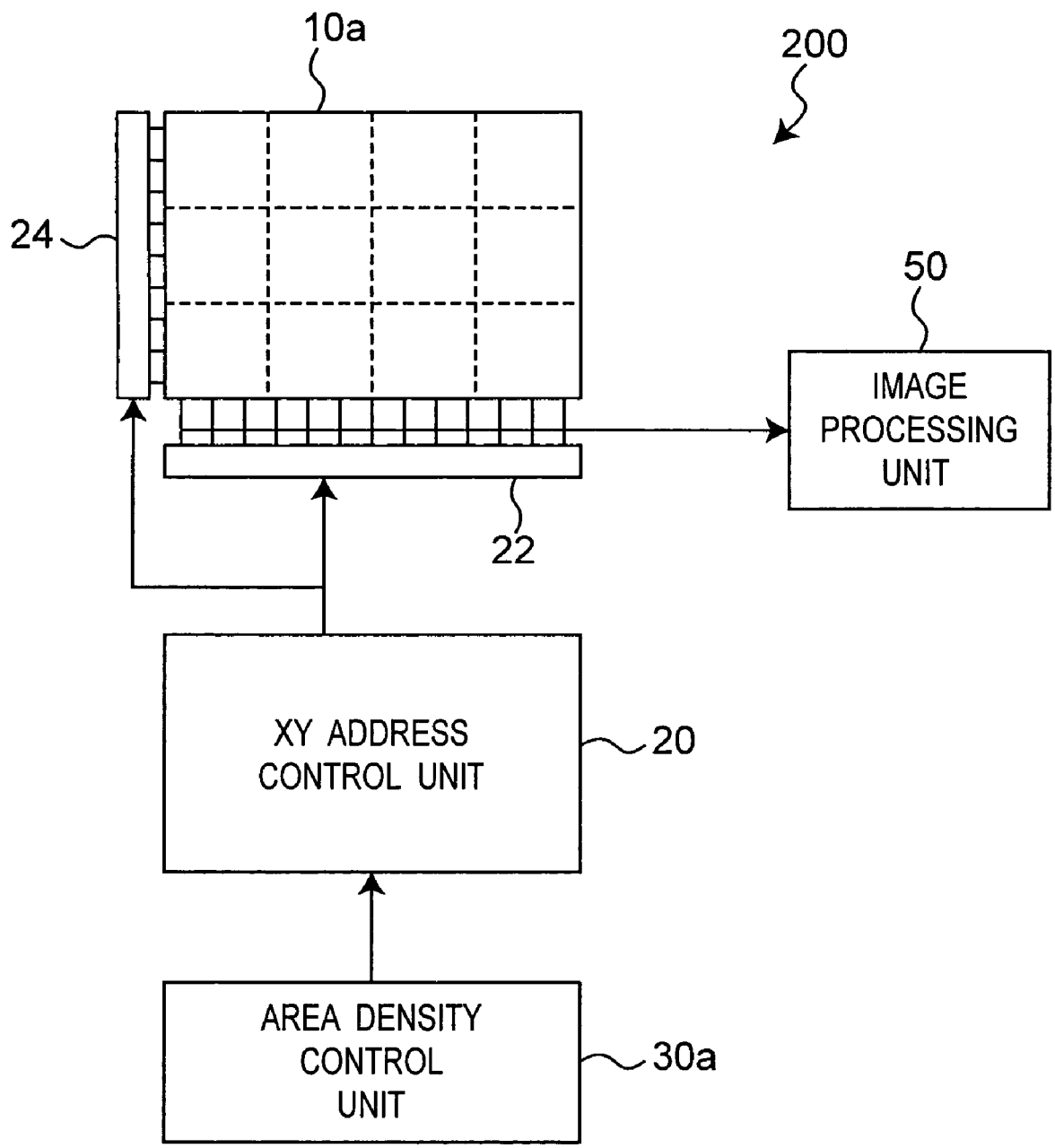
FIG. 20 is a block diagram of an imaging apparatus according to a second embodiment of the invention.
Figure 21:
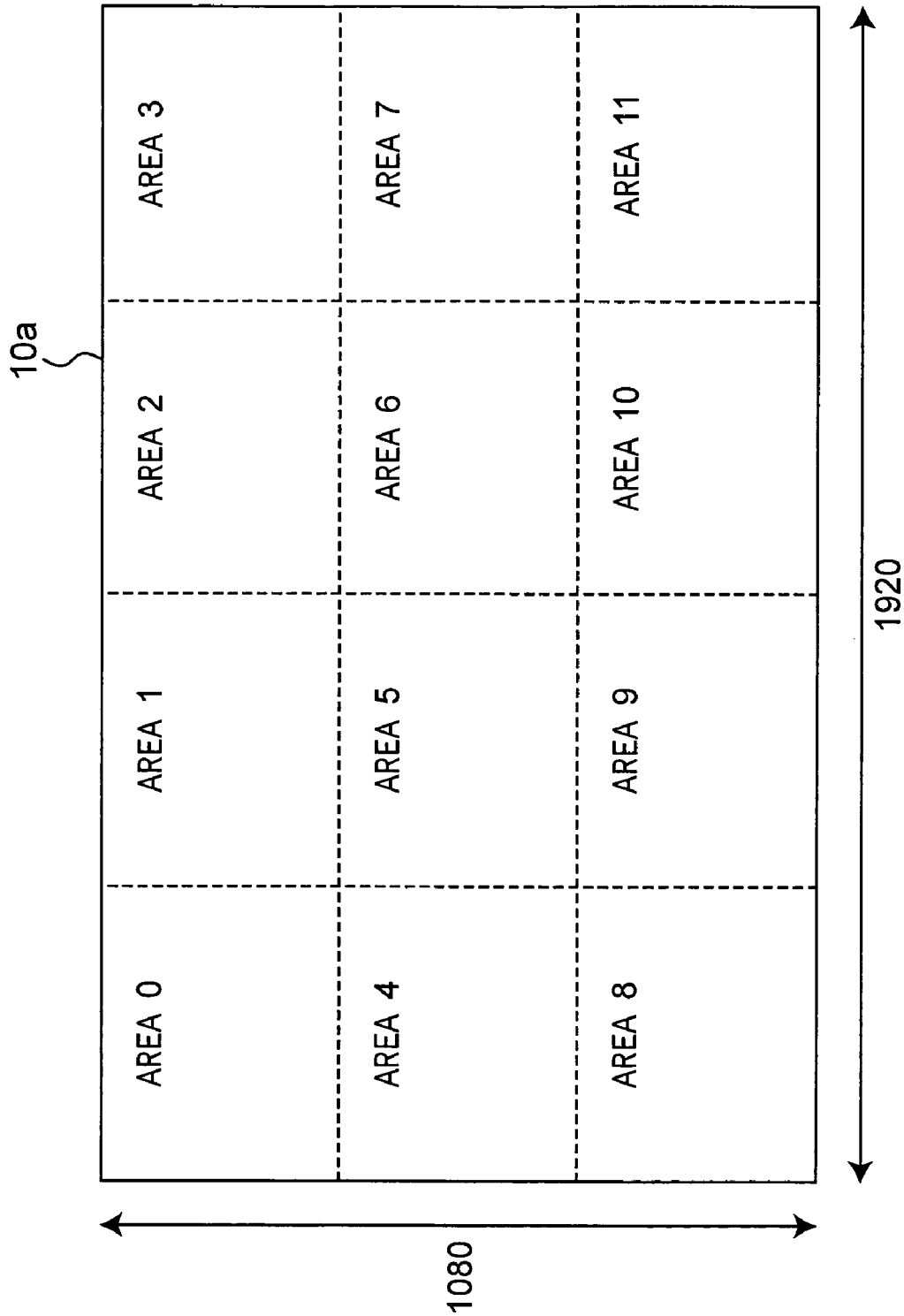
FIG. 21 shows the segmentation of the image sensor into a plurality of areas.

FIG. 20 is a block diagram of this imaging apparatus 200. As shown in FIG. 21, the image sensor 10a is segmented into a 4×3 matrix of twelve areas, area 0 to area 11. Proceeding left to right, top to bottom from the top left area, these areas are identified sequentially from area 0, area 1, area 2 to area 11. Each area contains 172,800 pixels.

The density of pixels read from each area is set by the area density control unit 40. In the example described below, the area density control unit 40 sets a pixel density of 1 in areas 1, 2, 5, and 6, and sets a pixel density of ¼ for the other areas. All pixels are therefore read from areas 1, 2, 5, 6 where the pixel density is set to 1, and one of every four pixels in the other areas where the pixel density is ¼ is read by skipping every other pixel horizontally and skipping every other row as described above. As noted above, pixels at coordinates (0,0), (2,0), (4,0), and so forth are read horizontally in the X direction, and pixels (0,0), (0,2), (0,4), and so forth are read vertically in the Y direction.

As a result, a total of 172,800*4+43,200*8=1,036,800 pixels are read in one frame in this example. While 2,073,600 pixels are read in one frame from the image sensor 10a if all pixels are read, in this example only ½ the pixels are read.

This embodiment likewise contains areas read at two different resolutions, that is, high and low resolution areas. However, if a high resolution is set for the overall image, that is, if the uniform pixel density of the image is set to 1, a video signal with the same pixel density overall can be generated by converting the signals in the low resolution areas to match the higher resolution areas as described in the first embodiment. As a result, an image with a high resolution overall can be output.

In this example, therefore, signals from areas 1, 2, 5, 6 can be output at the original resolution because the pixel density was 1. The other areas were sampled at a ¼ pixel density, however, and must therefore be converted to a pixel density of 1 to match the resolution in areas 1, 2, 5, 6. The method described in the first embodiment can be used for this conversion.

The area selected for high resolution imaging is typically the part containing the main subject or the area of greatest interest in the case of a motion picture. By thus selecting the area of interest for high resolution imaging when viewing video, the image also appears to be a high resolution image overall.

By driving the imaging apparatus as described above, video can be captured at an apparently high resolution at a high frame rate even when the number of pixels that can be captured from the image sensor within one frame period is limited.

Figure 22:
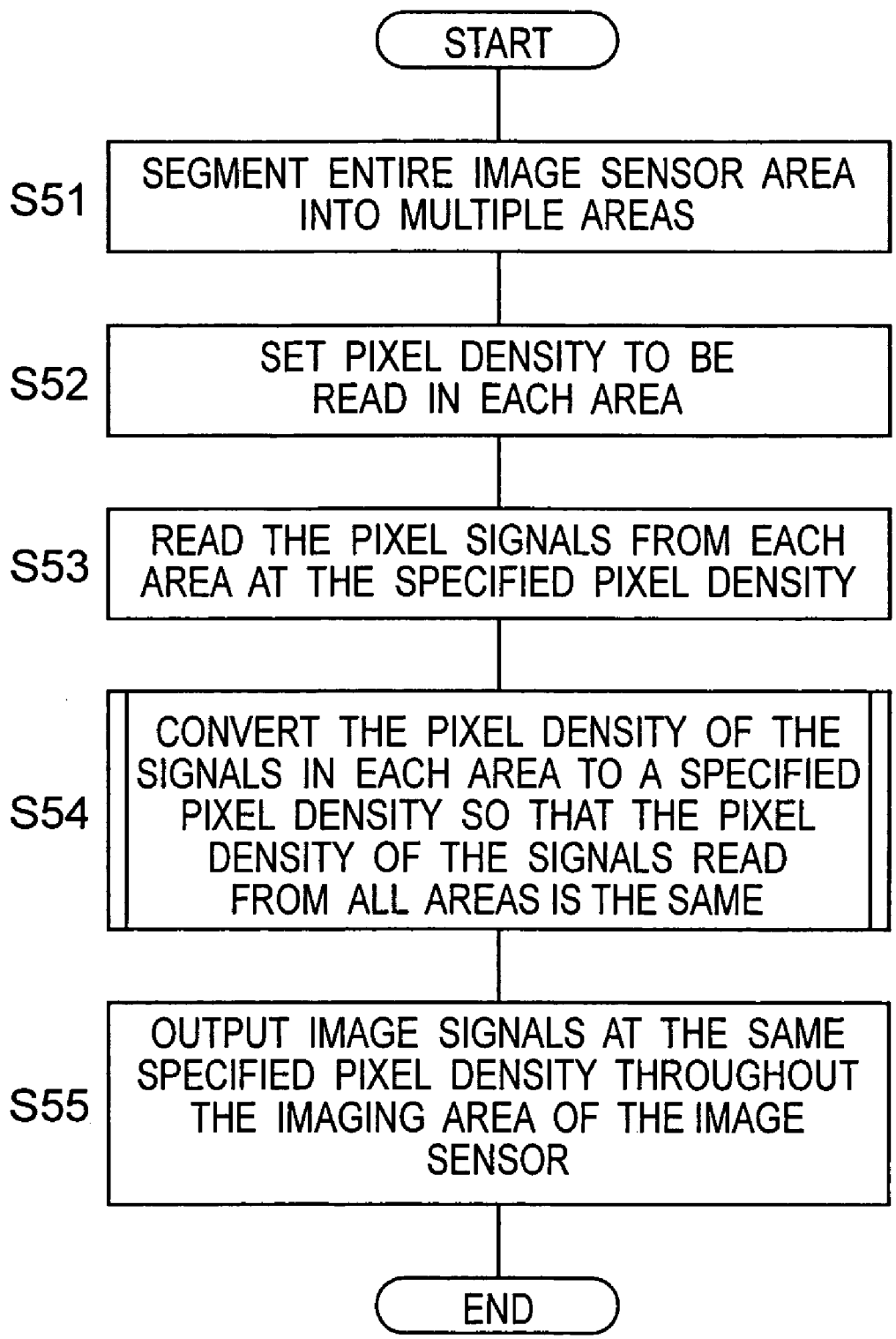
FIG. 22 is a flow chart of an imaging method according to a second embodiment of the invention.

FIG. 22 is a flow chart of the imaging method of this second embodiment of the invention.

(a) The entire image area of the image sensor 10a is segmented into a plurality of areas (area 0 to area 11) (S51).

(b) Set the pixel density to be read in each area (S52).

(c) Read the pixel signals from each area at the specified pixel density (S53).

(d) Convert the pixel density of the signals in each area to a specified pixel density so that the pixel density of the signals read from all areas is the same specified pixel density (S54). This step S54 is described in further detail below.

(e) Image signals at the same specified pixel density throughout the imaging area of the image sensor 10a are then output (S55).

FIG. 23 is a flow chart showing step S54 in detail.

(i) A specified uniform pixel density is set for the entire image area (S61).

(ii) Each area is selected sequentially from all of the segmented areas (S62).

(iii) Whether the signals read from the selected area are read at the same pixel density as the uniform pixel density is then determined (S63). If the pixel density is the same, operation goes to step S66.

(iv) If the pixel density of the signals in the selected area is lower than the uniform pixel density, signals for the missing pixels are interpolated to achieve the same uniform pixel density (S64). Operation then proceeds from step S66.

(v) If the pixel density of the signals in the selected area is higher than the uniform pixel density, the signals are downsampled to the uniform pixel density (S65). Operation then proceeds from step S66.

(vi) Whether the pixel density of all areas has been adjusted to the uniform pixel density is determined (S66). If an area that has not be adjusted to the uniform pixel density remains, operation loops back to step S62. If all areas have been adjusted to the same pixel density, operation continues from step S67.

(vii) An image signal having the same uniform pixel density throughout the image area is acquired (S67).

An imaging apparatus according to the present invention can be used for such imaging applications as capturing motion picture video, particularly motion picture video at a high frame rate, and when capturing images with an extremely large number of pixels in each frame, such as with high definition television.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An imaging apparatus comprising:
an image sensor having a two-dimensional array of pixels, each of the pixels comprising an element operable to produce an electric charge by photoelectrically converting light from an imaged subject, and a part operable to accumulate the produced charge and output an accumulated charge or a signal representing the accumulated charge;
an area control unit operable to define a specified area of said image sensor containing less than all of said array of pixels; and
an area density control unit operable to specify in said specified area a concentration of said pixels read from the image sensor wherein said concentration of said pixels in the specified area read from the image sensor is greater than a further concentration of said pixels outside of said specified area read from the image sensor.

2. An imaging apparatus according to claim 1, wherein a concentration of pixels determined by a ratio of how many pixels are output from the area to how many pixels are in the area is controlled to correspond to the specified value by thinning pixels to be read, when the specified area having a concentration specified by the area control unit and the area density control unit is read.

3. An imaging apparatus according to claim 2, wherein said image processing unit is operable to convert signals in each read area to a specified concentration determined by a ratio of how many pixels are output from the area to how many pixels are in the area so that the density of all signals read from the image area is the same specified density and output the resulting image signal.

4. An imaging apparatus according to claim 1, further comprising:
a pixel mixing unit operable to mix pixel signal, wherein a concentration determined by a ratio of how many pixels are output from the area to how many pixels how many pixels are in the area is controlled to correspond to the specified value by mixing the pixel signal, when the specified area having a concentration specified by the area control unit and the area density control unit is read.

5. An imaging apparatus according to claim 1, further comprising:
an image processing unit operable to apply a specific signal processing to an output of said image sensor and output an image signal; and
a motion detection unit operable to identify an area containing a moving subject based on the image signal output from said image processing unit;
wherein the area identified by said motion detection unit is the specified area defined by said area control unit.

6. An imaging apparatus according to claim 5, wherein the image processing unit further comprising:
an image forming unit operable to form an image in which a concentration determined by a ratio of how many pixels are output from the area to how many pixels are in the area corresponds to minimum concentration specified by the area density control unit,
wherein the image is provided as input video signal to the motion detection unit.

7. An imaging apparatus according to claim 6, wherein the image in which the concentration corresponding to the minimum concentration is formed in the image processing unit by thinning the pixels.

8. An imaging apparatus according to claim 6, wherein the image in which the concentration corresponding to the minimum concentration is formed in the image processing unit by averaging the pixels adjacent each other.

9. An imaging apparatus according to claim 5, wherein said motion detection unit is operable to identify, as the area containing the moving subject an area containing a plurality of pixels exhibiting a signal change at least equal to a specific threshold value between temporally consecutive frames output from said image processing unit.

10. An imaging apparatus according to claim 5, wherein said area density control unit is operable to set a concentration determined by a ratio of how many pixels are output from the area to how many pixels are in the area identified by said motion detection unit to a higher concentration than a concentration of pixels read from an area outside the identified area.

11. An imaging apparatus according to claim 5, wherein said area density control unit is operable to set a concentration of determined by a ratio of how many pixels are output from the area to how many pixels are in the area identified by said motion detection unit to a lower concentration than a concentration of pixels read from an area outside the identified area.

12. An imaging apparatus according to claim 1, further comprising:
an image processing unit operable to apply a specific signal processing to an output of said image sensor and output an image signal; and
a frequency component detection unit operable to process a frame contained in the image signal output from said image processing unit and identify an area in the frame containing pixels having a high frequency component;
wherein the area identified by said frequency component detection unit is the area defined by said area control unit.

13. An imaging apparatus according to claim 1, further comprising:
a line control unit operable to specify at least one of horizontal line or vertical line to be read at each frame,
wherein pixel signal of the horizontal line or the vertical line specified by the line control unit are input to the frequency component detection unit.

14. An imaging apparatus according to claim 1, further comprising:
an image processing unit operable to apply a specific signal processing to an output of said image sensor and output an image signal; and
a focus control unit operable to control image focusing in said imaging apparatus;
wherein an area including a rangefinding point used by said focus control unit to control focusing is the area defined by said area control unit.

15. An imaging apparatus according to claim 1, wherein said image sensor is a CMOS image sensor.

16. An imaging apparatus according to claim 1, further comprising an address control unit operable to control the pixels read from said image sensor.

17. An imaging apparatus comprising:
an image sensor having a two-dimensional array of pixels, each of the pixels comprising an element operable to produce an electric charge by photoelectrically converting light from an imaged subject and a part operable to accumulate the produced charge and output an accumulated charge or a signal representing the accumulated charge; and
an area concentration control unit operable to segment said image sensor into a plurality of specified areas and to specify in each of said areas a respective concentration of said pixels read from the image sensor wherein concentration of pixels in one of said areas read from the image sensor is greater than concentration of pixels in another of said areas read from the image sensor.

18. An imaging apparatus according to claim 17, further comprising:
an image processing unit operable to apply a specific signal processing to an output of said image sensor and output an image signal;
wherein said image processing unit is operable to convert signals in each read area to a specified concentration determined by a ratio of how many pixels are output from the area to how many pixels are in the area so that the concentration of all signals read from the image area is the same specified concentration and output the resulting image signal.

* * * * *